United States Patent
Harada

[19]

[11] Patent Number: 6,054,822
[45] Date of Patent: Apr. 25, 2000

[54] METHOD OF DETECTING OVERLOAD STATE OF ON-VEHICLE ELECTRIC MOTOR AND APPARATUS THEREOF

[75] Inventor: Kouichi Harada, Hyogo, Japan

[73] Assignee: Mitsubishi Denki Kabushiki Kaisha, Tokyo, Japan

[21] Appl. No.: 08/467,000

[22] Filed: Jun. 6, 1995

Related U.S. Application Data

[63] Continuation of application No. 08/274,698, Jul. 14, 1994, abandoned.

[30] Foreign Application Priority Data

Nov. 1, 1993 [JP] Japan .................................. 5-273872

[51] Int. Cl.[7] ........................................................ H02P 7/00
[52] U.S. Cl. ............................................................. 318/434
[58] Field of Search ................................... 318/280–286, 318/268, 272, 466–470, 434; 49/26, 28–30, 43, 100, 118, 138; 160/1, 29, 49, 291, 292, 293.1; 307/10.1; 246/210, 223; 361/23, 31, 33

[56] References Cited

U.S. PATENT DOCUMENTS

| | | | |
|---|---|---|---|
| 4,476,416 | 10/1984 | Licata et al. | 381/283 |
| 4,533,901 | 8/1985 | Lederle | 49/28 X |
| 4,574,226 | 3/1986 | Binder | 318/434 X |
| 4,773,183 | 9/1988 | Okushima et al. | 49/28 |
| 4,810,943 | 3/1989 | Kawaguchi et al. | 318/434 |
| 5,069,000 | 12/1991 | Zuckerman | 49/28 |
| 5,306,992 | 4/1994 | Droge | 318/483 |
| 5,334,876 | 8/1994 | Washeleski et al. | 318/469 X |

FOREIGN PATENT DOCUMENTS 137291  8/1989  Japan .

OTHER PUBLICATIONS

Examples of Energy Conversion: The Commutator Machine, Skilling, pp. 111,121.

*Primary Examiner*—Jonathan Wysocki

[57] ABSTRACT

A method of controlling an on-vehicle electric opening/closing body includes the steps of detecting an increased amount of driving current of a motor at a predetermined time interval, comparing the increased amount of the driving current, the number of times of continuous increases in driving current, or an accumulated value of the increased amount of the driving current with a predetermined threshold to perform decision of over load, and varying the threshold according to voltage applied to the motor, rotation directions of the motor, or a type of object generating the over load. It is thereby possible to surely detect the over load which is accidentally generated when sliding a sun-roof, a power window, or the like.

28 Claims, 18 Drawing Sheets

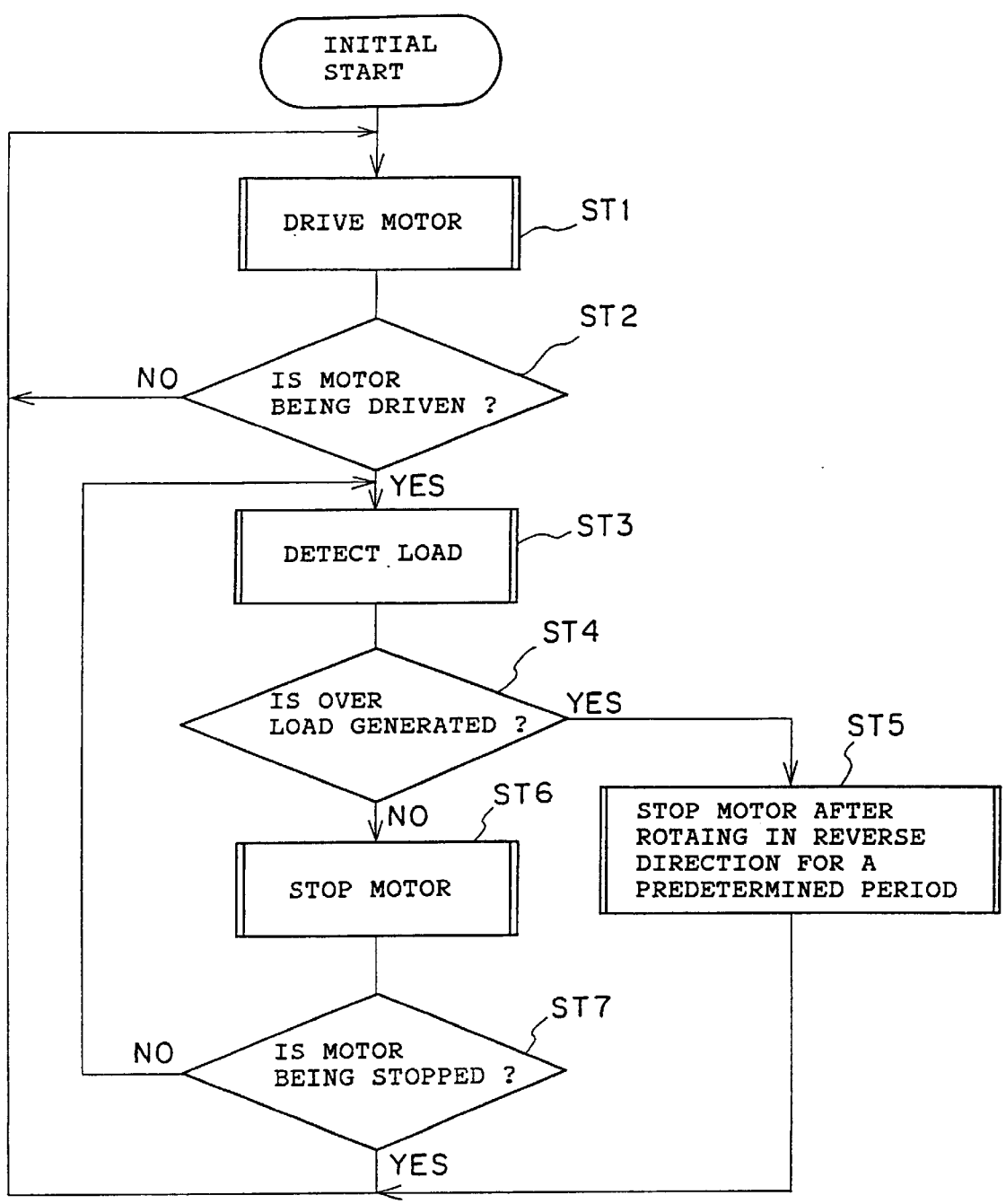

FIG. 9

| APPLIED VOLTAGE | THRESHOLD |
|---|---|
| 8V OR LESS | $1 \left( \frac{\Delta V}{\Delta t} \right)$ |
| 8.5V | $1 \left( \frac{\Delta V}{\Delta t} \right)$ |
| 9V | $1.5 \left( \frac{\Delta V}{\Delta t} \right)$ |
| ⋮ | ⋮ |
| 17V | $3 \left( \frac{\Delta V}{\Delta t} \right)$ |
| 17.5V | $3.5 \left( \frac{\Delta V}{\Delta t} \right)$ |
| 18V OR MORE | $3.5 \left( \frac{\Delta V}{\Delta t} \right)$ |

FIG. 13

| APPLIED VOLTAGE | THRESHOLD IN REGULAR ROTATION | THRESHOLD IN REVERSE ROTATION |
|---|---|---|
| 8V OR LESS | $1\left(\frac{\Delta V}{\Delta t}\right)$ | $0.8\left(\frac{\Delta V}{\Delta t}\right)$ |
| 8.5V | $1\left(\frac{\Delta V}{\Delta t}\right)$ | $0.8\left(\frac{\Delta V}{\Delta t}\right)$ |
| 9V | $1.5\left(\frac{\Delta V}{\Delta t}\right)$ | $1.2\left(\frac{\Delta V}{\Delta t}\right)$ |
| ⋮ | ⋮ | ⋮ |
| 17V | $3\left(\frac{\Delta V}{\Delta t}\right)$ | $2.7\left(\frac{\Delta V}{\Delta t}\right)$ |
| 17.5V | $3.5\left(\frac{\Delta V}{\Delta t}\right)$ | $3.1\left(\frac{\Delta V}{\Delta t}\right)$ |
| 18V OR MORE | $3.5\left(\frac{\Delta V}{\Delta t}\right)$ | $3.3\left(\frac{\Delta V}{\Delta t}\right)$ |

FIG. 16

| APPLIED VOLTAGE | THRESHOLD (NUMBER OF TIMES) |
|---|---|
| 8V OR LESS | 6 |
| 8.5V | 6 |
| 9V | 6 |
| ⋮ | ⋮ |
| 17V | 3 |
| 17.5V | 3 |
| 18V OR MORE | 3 |

FIG. 19

| APPLIED VOLTAGE | FIRST THRESHOLD | SECOND THRESHOLD |
|---|---|---|
| 8V OR LESS | $1\left(\frac{\Delta V}{\Delta t}\right)$ | $0.5\left(\frac{\Delta V}{\Delta t}\right)$ |
| 8.5V | $1\left(\frac{\Delta V}{\Delta t}\right)$ | $0.5\left(\frac{\Delta V}{\Delta t}\right)$ |
| 9V | $1.5\left(\frac{\Delta V}{\Delta t}\right)$ | $1\left(\frac{\Delta V}{\Delta t}\right)$ |
| ⋮ | ⋮ | ⋮ |
| 17V | $3\left(\frac{\Delta V}{\Delta t}\right)$ | $2.5\left(\frac{\Delta V}{\Delta t}\right)$ |
| 17.5V | $3.5\left(\frac{\Delta V}{\Delta t}\right)$ | $3\left(\frac{\Delta V}{\Delta t}\right)$ |
| 18V OR MORE | $3.5\left(\frac{\Delta V}{\Delta t}\right)$ | $3\left(\frac{\Delta V}{\Delta t}\right)$ |

6,054,822

METHOD OF DETECTING OVERLOAD STATE OF ON-VEHICLE ELECTRIC MOTOR AND APPARATUS THEREOF

This application is a continuation, of application Ser. No. 08/274,698 filed on Jul. 14, 1994, now abandoned.

BACKGROUND OF THE INVENTION

2. Field of the Invention

The present invention relates to a method of controlling an on-vehicle electric opening/closing body to detect blocking or pinching of a sliding portion generated during driving a motor so as to safely control opening/closing operations of the on-vehicle electric opening/closing body such as a vehicle sun-roof, or a vehicle power window.

2. Description of the Related Art

FIG. 1 is a circuit diagram showing a safety device for a vehicle sun-roof employing a conventional method of controlling an on-vehicle electric opening/closing body, which is disclosed in, for example, Japanese Patent Publication (Kokoku) No. 1-37291. In the drawing, reference numeral 11 indicates a motor to drive a sun-roof panel of the sun-roof serving as the on-vehicle electric opening/closing body. Reference numeral 30 indicates a driving circuit for the motor 11, 31 and 32 are relay contacts of the driving circuit, and 33 and 34 are relay coils. Reference numeral 40 indicates a series resistor connected to the motor 11 to detect driving current of the motor 11, and 50 is a switch to output an opening/closing starting signal for the sun-roof panel.

Reference numeral 60 indicates a filtering circuit to cut a high frequency component generated by the series resistor 40, and 70 is an amplifier to amplify an output signal from the filtering circuit 60. Reference numeral 80 indicates an adding circuit to add a predetermined value to an output signal VS from the amplifier 70 so as to set overcurrent of the motor 11, and 90 is a delay circuit to delay one output signal VD from the adding circuit 80.

Reference numeral 100 indicates an over load detecting circuit to detect over load of the motor 11 by taking, as inputs, the output signal VS from the amplifier 70 and an output signal VDD from the delay circuit 90, 101 and 102 are comparators of the over load detecting circuit 100, and 103 is a signal drive transistor. Reference numeral 110 indicates a memory circuit in which an amount of current (threshold) is stored at a time of pinching over load by receiving the other output signal VM from the adding circuit 80, 111 is a buffer of the memory circuit, 112 is a hold capacitor, 113 is a switching transistor, and 114 is a comparator. Reference numeral 120 indicates a stop circuit for the motor 11, and 121 and 122 are switching transistors of the stop circuit. Reference numeral 130 indicates an inverting circuit for the motor 11, and 131 is a transistor operated by a timer of the inverting circuit. Reference numeral 140 indicates a detecting circuit including a transistor 141, to detect a closing signal of the sunroof panel from the switch 50. Reference numeral 150 indicates a masking circuit to mask rush current at a starting time of the motor 11.

A description will now be given of the operation of the apparatus shown in FIG. 1. When the switch 50 is turned ON on the closing side to close the sun-roof panel, the transistor 141 in the detecting circuit 140 is turned OFF, and the switching transistor 122 in the motor stop circuit 120 is turned ON. Thus, current is present in the relay coil 34 in the driving circuit 30, thereby connecting the relay contact 32 to the ground so as to drive the motor 11.

The motor 11 is driven to flow its driving current in the series resistor 40, and voltage drop across the series resistor 40 generates voltage. The generating voltage is fed into the filtering circuit 60 as a driving current signal for the motor 11, and passes through the filtering circuit 60 to remove a high frequency noise component from the voltage. Thereafter, the voltage is input into the amplifier 70 to be amplified. The output signal VS from the amplifier 70 is supplied to the adding circuit 80 and the over load detecting circuit 100. The adding circuit 80 adds the predetermined value to the input signal VS to generate and output signals VD and VM. The signal VD is delayed by a predetermined time by the delay circuit 90 to become the signal VDD, and the signal VDD is supplied to the over load detecting circuit 100. Further, the signal VM is directly input into the memory circuit 110.

On the other hand, the switch 50 is turned ON on the closing side to actuate the timer of the masking circuit 150. The masking circuit 150 generates two kinds of output signals V200 and V300 depending upon timer operating periods (of 200 ms and 300 ms), and the output signals are respectively input into the memory circuit 110. That is, the signal V300 depending upon the timer operating period of 300 ms is input into the switching transistor 113 to turn ON the switching transistor 113 after an elapse of 300 ms from the starting time of the motor 11. Further, the signal V200 depending upon the timer operating period of 200 ms is input into a positive terminal of the comparator 114 to set output from the comparator 114 to ground voltage for a period of 200 ms from the starting time of the motor 11.

Therefore, the hold capacitor 112 in the memory circuit 110 is kept to the ground voltage for the period of 200 ms from the starting time of the motor 11, and is charged to voltage of the output signal VM from the adding circuit 80 for a period between time points of 200 ms and 300 ms so as to store the charged voltage as a threshold VMC. The threshold VMC is supplied to the over load detecting circuit 100. In the over load detecting circuit 100, the comparator 101 compares the output signal VS from the amplifier 70 with the output signal VDD from the delay circuit 90, and the comparator 102 compares the output signal VS with the threshold VMC from the memory circuit 110. When the load slides under a normal state, the output signal VS from the amplifier 70 is below the threshold VMC and the output signal VDD from the delay circuit 90. Consequently, the over load detecting circuit 100 outputs no detected signal, and the stop circuit 120 and the inverting circuit 130 are not actuated.

A description will now be given of the operation in case over load occurs during sliding. In this case, since overcurrent is present in the motor 11, the voltage drop across the series resistor 40 is increased to cause a rise of the output voltage VS from the amplifier 70.

At this time, the signal VDD is delayed by the delay circuit 90 to rise slower than a varying time of the signal VS, resulting in a time zone in which the signal VS exceeds the signal VDD. The output signal VS from the amplifier 70 may increase to exceed the threshold VMC.

When the output signal VS from the amplifier 70 exceeds at least one of the signal VDD and the threshold VMC as set forth above, in the over load detecting circuit 100, output from one or both of the comparators 101 and 102 is set to the ground voltage, and the transistor 103 is turned OFF.

Thereby, in the stop circuit 120, the switching transistor 121 is turned ON, and the switching transistor 122 is turned OFF. When the switching transistor 122 is turned OFF, no current is present in the relay coil 34 in the driving circuit 30. Thus, the relay contact 32 is turned OFF to interrupt driving current so as to stop the motor 11. On the other hand, the switching transistor 121 is turned ON to actuate the timer in the inverting circuit 130, and to turn ON the transistor 131 therein, resulting in current in the relay coil 33 in the driving circuit 30. Therefore, during the timer in the inverting circuit 130 is operated, the relay contact 31 is connected to the ground, and reverse driving current is fed into the motor 11 to reversely rotate the motor 11 for the feeding period.

The conventional method of controlling the on-vehicle electric opening/closing body has the following problems. That is, when variation in the driving current of the motor 11 is slower than a time constant of the delay circuit 90, the output signal VS from the amplifier 70 never exceeds the output signal VDD from the delay circuit 90. Then, there is one problem in that over load can not be detected. In addition, any obstacle may be present while the sun-roof panel is slid immediately after a masking period of 200 ms from the starting time of the motor 11, that is, any obstacle may be present for the period between the time points of 200 ms and 300 ms after the starting time. In this case, overcurrent in the motor 11 due to the obstacle increases the output signal VM so that the threshold VMC stored in the memory circuit 110 is set to a higher value than would be in a normal state. Accordingly, a difference between the signal VS and the threshold VMC is thereafter increased, and the signal VS never exceeds the threshold VMC even if the over load occurs during sliding the sun-roof panel after the threshold VMC becomes higher. Thus, there are other problems in that the over load can not be detected, resulting in a complicated and dangerous opening/closing control for the on-vehicle electric opening/closing body.

SUMMARY OF THE INVENTION

In order to overcome the problems set forth above, it is an object of the present invention to provide a method of controlling an on-vehicle electric opening/closing body to surely detect over load generated during sliding the on-vehicle electric opening/closing body such as a sun-roof.

According to the first aspect of the present invention, there is provided, for achieving the above object, a method of controlling an on-vehicle electric opening/closing body including the steps of detecting an amount of variation in driving current for a motor due to generation of over load at predetermined time intervals, and performing decision of over load by comparing the amount of variation with a predetermined threshold.

As stated above, according to the first aspect of the present invention, the amount of variation in the driving current for the motor is detected at predetermined time intervals, and is compared with the predetermined threshold to perform the decision of over load. Since this eliminates the need for a threshold VMC in the driving current itself, even if any obstacle exists immediately after a masking period, it is possible to surely detect the over load generating due to pinching of obstacles in a sliding portion during sliding the on-vehicle electric opening/closing body such as a sun-roof. Further, if the predetermined threshold or the predetermined time interval is set to an appropriate value or an appropriate time interval, it is possible to surely detect the over load even in case of slower variation in the driving current.

According to the second aspect of the present invention, there is provided a method controlling an on-vehicle electric opening/closing body including the steps of detecting an increase in driving current for a motor due to generation of over load at predetermined time intervals, and performing decision of over load by comparing the number of times of continuous increases with a predetermined threshold.

As stated above, according to the second aspect of the present invention, the continuous increases in the driving current for the motor is detected at the predetermined time intervals, and the number of times of continuous increases is compared with the predetermined threshold for the decision of over load, resulting in reduction of an amount of a program memory.

According to the third aspect of the present invention, there is provided a method of controlling an on-vehicle electric opening/closing body including the steps of detecting variation in driving current for a motor due to generation of over load at predetermined time intervals, accumulating amounts of variation during continuous variation, and comparing the accumulated value with a predetermined threshold for decision of over load.

As stated above, according to the third aspect of the present invention, when there is the continuous variation in the driving current for the motor detected at the predetermined time intervals, the accumulated value of the amount of variation is compared with the predetermined threshold for the decision of over load. It is thereby possible to reduce a time required for the decision of over load.

According to the fourth aspect of the present invention, there is provided a method of controlling an on-vehicle electric opening/closing body including the step of determining a threshold used for decision of over load according to voltage applied to a motor.

As state above, according to the fourth aspect of the present invention, the threshold for the decision of over load is determined depending upon the voltage applied to the motor. It is thereby possible to perform stable decision of over load even in case of variation in battery voltage.

According to the fifth aspect of the present invention, there is provided a method of controlling an on-vehicle electric opening/closing body including the step of setting different thresholds according to rotation directions of a motor.

As stated above, according to the fifth aspect of the present invention, the different thresholds are set according to the rotation directions of the motor. It is thereby possible to surely decide over load even if an amount of load is varied according to the rotation directions of the motor.

According to the sixth aspect of the present invention, there is provided a method of controlling an on-vehicle electric opening/closing body including the steps of preparing a plurality of thresholds, and selectively using one of the thresholds according to an object of over load.

As stated above, according to the sixth aspect of the present invention, the plurality of thresholds are prepared to be selectively used according to predetermined timing. It is thereby possible to surely decide the over load even if the objects (obstacles) of the over load have various hardness.

The above and further objects and novel features of the invention will more fully appear from the following detailed description of the preferred embodiments when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 5 is a flowchart showing the entire operation in the method of controlling the on-vehicle electric opening/closing body according to the embodiment;

FIG. 9 is a table diagram showing a relationship between voltage applied to a motor and a threshold in the embodiment;

FIG. 13 is a table diagram showing a relationship between voltage applied to a motor and a threshold in the embodiment;

FIG. 16 is a table diagram showing a relationship between voltage applied to a motor and a threshold in the embodiment;

FIG. 19 is a table diagram showing a relationship between voltage applied to a motor and a threshold in the embodiment.

DETAILED DESCRIPTION OF THE PREFERRED EMBODIMENTS

Preferred embodiments of the invention will now be described in detail referring to the accompanying drawings.
Embodiment 1

Figure 1:
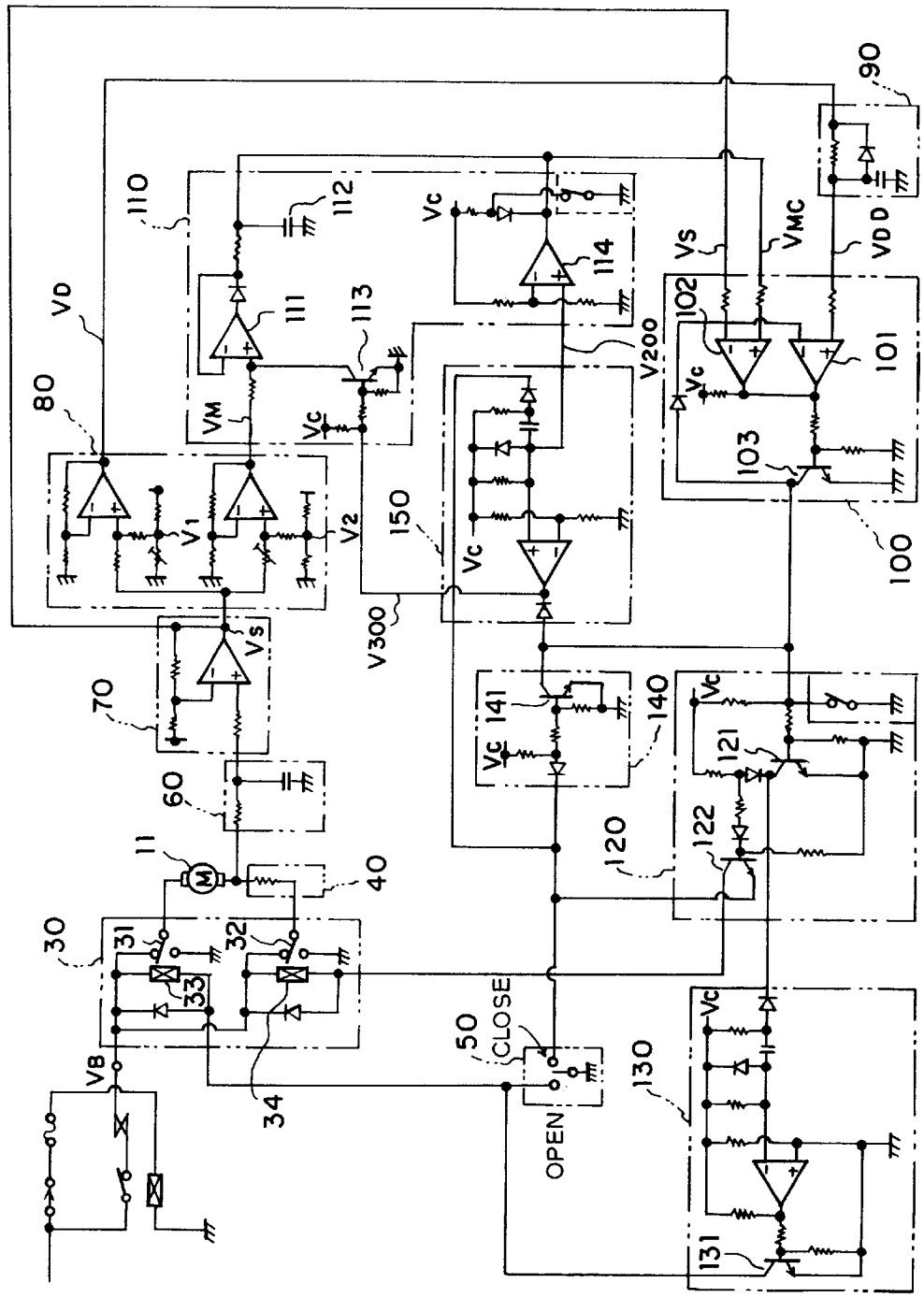
FIG. 1 is a circuit diagram showing a safety device for a vehicle sun-roof employing a conventional method of controlling an on-vehicle electric opening/closing body.
Figure 2:
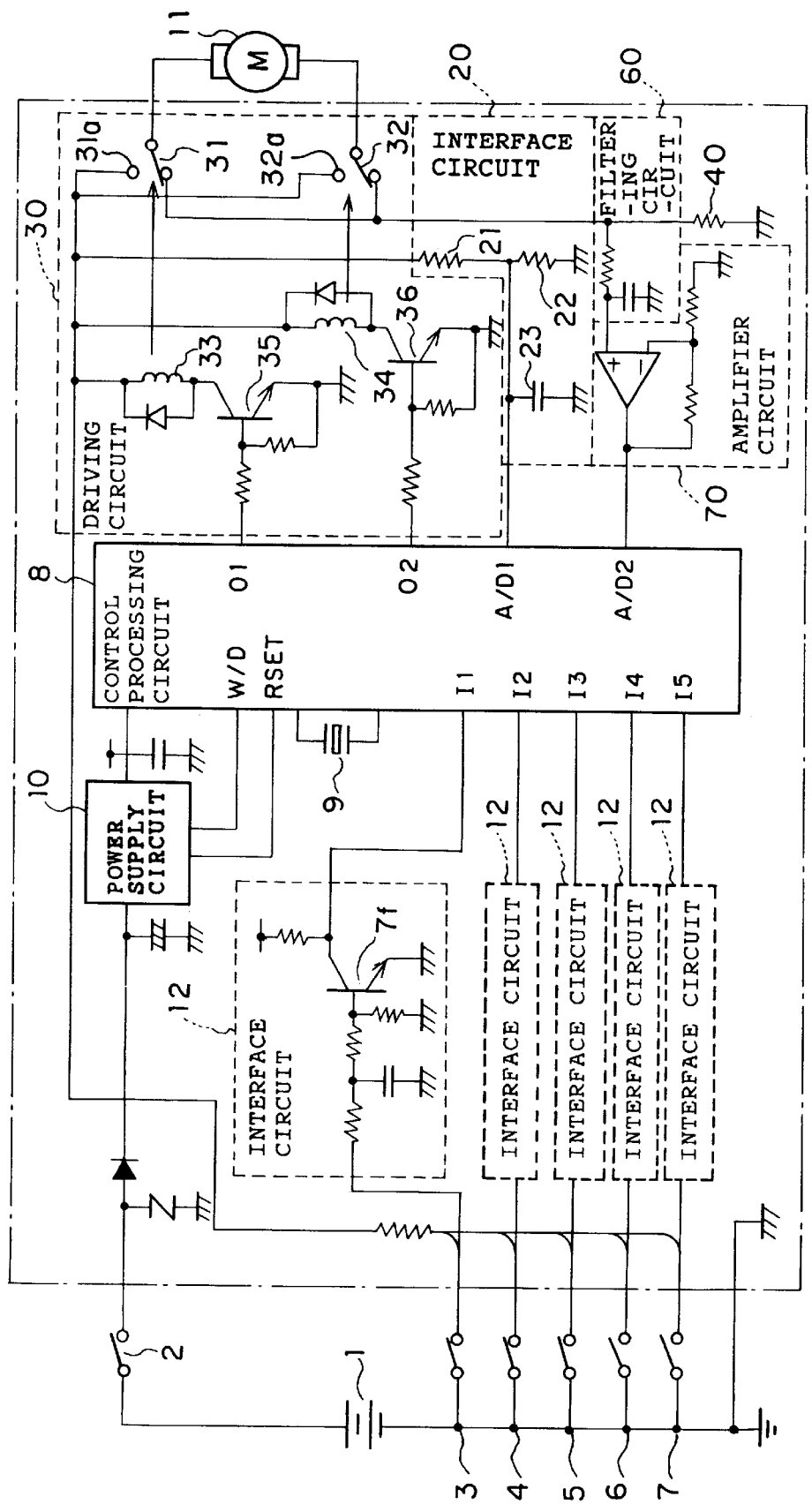
FIG. 2 is a circuit diagram showing a control unit for a sun-roof employing a method of controlling an on-vehicle electric opening/closing body according to the embodiment 1 of the present invention.

A description will now be given of the embodiment 1 with reference to the drawings. FIG. 2 is a circuit diagram showing a control unit for a sun-roof employing a method of controlling an on-vehicle electric opening/closing body according one embodiment in the first aspect of the present invention. In FIG. 2, reference numeral 11 indicates a motor, 30 is a driving circuit, 31 and 32 are relay contacts, 33 and 34 are relay coils, 40 is a series resistor, 60 is a filtering circuit, and 70 is an amplifier. Since these component parts are identical with or equivalent to conventional component parts shown by the same reference numerals in FIG. 1, and descriptions thereof are omitted.

Reference numeral 1 indicates a battery mounted on a vehicle, and 2 is an ignition switch connected to the battery 1. Reference numeral 3 indicates an opening switch to output an opening starting signal for a sun-roof panel, 4 is a closing switch to output a closing starting signal for the sun-roof panel, 5 is a full close position switch which is turned ON when the sun-roof panel is in a fully closed state, 6 is a full open position switch which is turned ON when the sun-roof panel is a fully opened state, and 7 is a tilt max position switch which is turned ON when the sun-roof panel reaches a tilt-up max position. Reference numeral 8 means a control processing circuit to drive a motor 11 through the driving circuit 30 depending upon states of switches 3 to 7 so as to control sliding of the sun-roof panel. For example, a microcomputer may be employed as the control processing circuit. Reference numeral 9 means a vibrator to supply the control processing circuit 8 with a clock pulse, and 10 is a power supply circuit to supply the control processing circuit 8 with power.

Reference numeral 12 indicates an interface circuit to input output signals from the opening switch 3, the closing switch 4, the full close position switch 5, the full open position switch 6, and the tilt max position switch 7 into input ports I1 to I5 of the control processing circuit 8. Reference numeral 20 indicates an interface circuit to input voltage applied to the motor 11 into an A/D1 port of the control processing circuit 8. The interface circuit 20 includes resistors 21 and 22 to divide voltage applied to the motor 11, and a capacitor 23 for absorbing noise. The driving circuit 30 includes driving transistors 35 and 36 to conduct or cut off current supplied to the relay coil 33 or 34 depending upon a signal output from an O1 port or an O2 port of the control processing circuit 8. Further, an output signal from the amplifier 70 is input into an A/D2 port of the control processing circuit 8. The A/D1 port and the A/D2 port serve as analog/digital converting ports of the control processing circuit 8.

Figure 3:
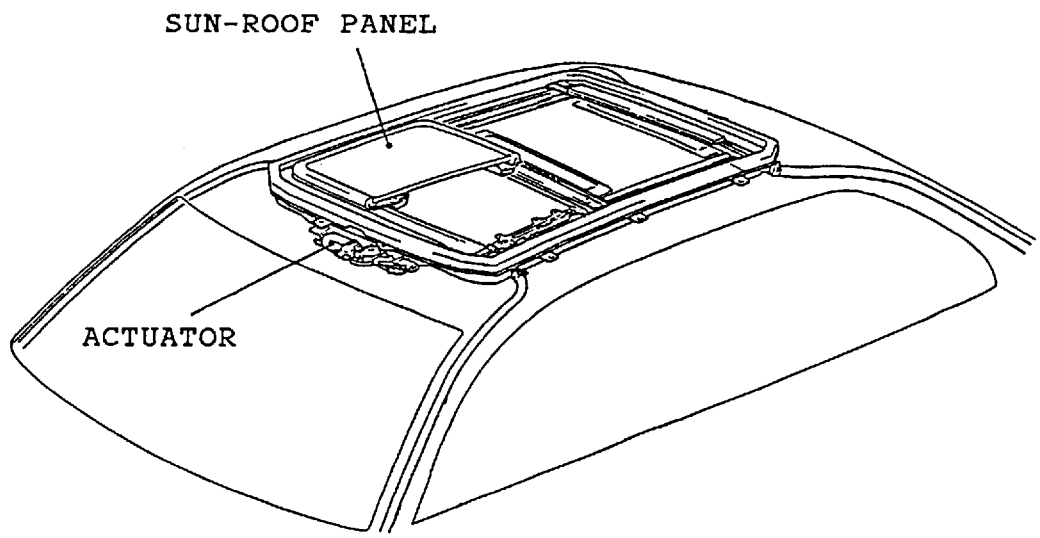
FIG. 3 is a partially cut-away perspective view showing an actuator for the controlled sun-roof.
Figure 4A:
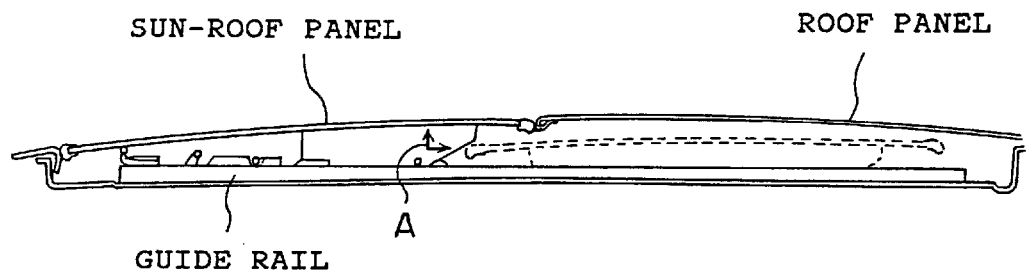
FIGS. 4A and 4B are sectional views showing sun-roof panel opening/closing operations, and tilt rising/falling operations in the sun-roof.
Figure 4B:
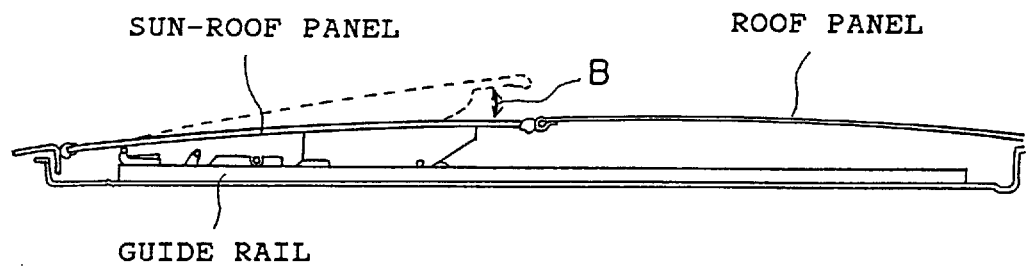

A description will now be given of the operation of the unit shown in FIG. 2. FIG. 3 is a partially cut-away perspective view of an actuator for the sun-roof controlled by the sun-roof control unit. FIGS. 4A and 4B are sectional views showing sun-roof panel opening/closing operations, and tilt rising/falling operations. The actuator for the sun-roof shown in FIG. 3 moves the sun-roof panel as shown by the arrow A in FIG. 4A to open and close the sun-roof. Further, the actuator vertically moves a back end of the sun-roof panel in a fully closed state as shown by the arrow B in FIG. 4B. "Tilt rising/falling operations" as used herein means operations to vertically move the back end of the sun-roof panel.

When the ignition switch 2 is turned ON, the battery 1 is connected to the power source circuit 10, and the power source circuit 10 feeds power to the control processing circuit 8, resulting in an actuated state. Further, at a power-ON time and at a time of failure of watch dog, the power source circuit 10 generates a reset signal to initialize the control processing circuit 8. Voltage from the battery 1 is applied to the relay coils 33, 34 of the driving circuit 30, and the applied voltage is divided by the resistors 21 and 22 of the interface circuit 20. Subsequently, noise is removed from the voltage by the capacitor 23 to be input into the A/D1 port of the control processing circuit 8.

When the motor 11 is regularly rotated, that is, performs the sun-roof panel opening operation and the tilt falling operation, the control processing circuit 8 sets the O1 port to a high level, and sets the O2 port to a low level. The driving transistor 35 in the driving circuit 30 is thereby turned ON to pass current in the relay coil 33 so as to connect the relay contact 31 thereof to a power source terminal 31a. Consequently, driving current from the battery 1 flows in a path including the relay contact 31, the motor 11, the relay contact 32, and the series resistor 40, that is, flows in the motor 11 in a regular direction, resulting in regular rotation of the motor 11.

When the motor 11 is reversely rotated, that is, performs the sun-roof panel closing operation and the tilt falling operation, the control processing circuit 8 sets the O2 port to a high level, and sets the O1 port to a low level. The driving transistor 36 in the driving circuit 30 is thereby turned ON to pass current in the relay coil 34 so as to connect the relay contact 32 thereof to a power source terminal 32a. Consequently, driving current from the battery 1 flows in a path including the relay contact 32, the motor 11, the relay contact 31, and the series resistor 40, that is, flows in the motor 11 in a reverse direction, resulting in reserve rotation of the motor 11.

ON/OFF signals of the opening switch 3, the closing switch 4, the full close position switch 5, the full open position switch 6 and the tilt max position switch 7 are once input into the corresponding interface circuits 12. The respective interface circuits 12 inputs a high level signal in case the connected switches 3 to 7 are in ON states, or inputs a low level signal in case of OFF states into the corresponding I1 port to I5 port of the control processing circuit 8. As set forth above, the A/D1 port of the control processing circuit 8 takes as input the signal obtained by dividing the voltage applied to the motor 11 by the resistors 21 and 22 in the interface circuit 20. Further, the A/D2 port takes as input a signal obtained by amplifying voltage drop due to the series resistor 40 by the amplifier 70, that is, a signal correlating to an amount of driving current of the motor 11.

A description will now be given of the basic operation of the unit shown in FIG. 2 with reference to a flowchart shown in FIG. 5. In an initial start after turning ON the power source, in Step ST1, levels of switch input by the switches 3 to 7 are detected, and driving processing of the motor 11 is performed depending upon the detected levels. Subsequently, in Step ST2, the result of processing in Step ST1 is decided. If the motor is driven, the operation proceeds to Step ST3, or if the motor is not driven, the operation returns to Step ST1 again. In Step ST3, a load detecting processing is performed to detect an over load state generated due to, for example, pinching of an obstacle. In Step ST4, it is decided whether or not over load occurs.

If it is decided that the over load occurs in Step ST4, the operation proceeds to Step ST5 where the motor 11 is reversed by a predetermined amount to be stopped, and thereafter the operation proceeds to Step ST1. If it is decided that no over load occurs in Step ST4, the operation proceeds to Step ST6. In Step ST6, a stopping processing of the motor 11 is performed depending upon the levels of switch input from the respective switches 3 to 7, and the result of processing in Step ST6 is decided in Step ST7. As a result, when the motor 11 is not stopped, the operation returns to processing in Step ST3 because the motor is being driven. Alternatively, when the motor 11 is being stopped, the operation proceeds to Step ST1 again.

Figure 6:
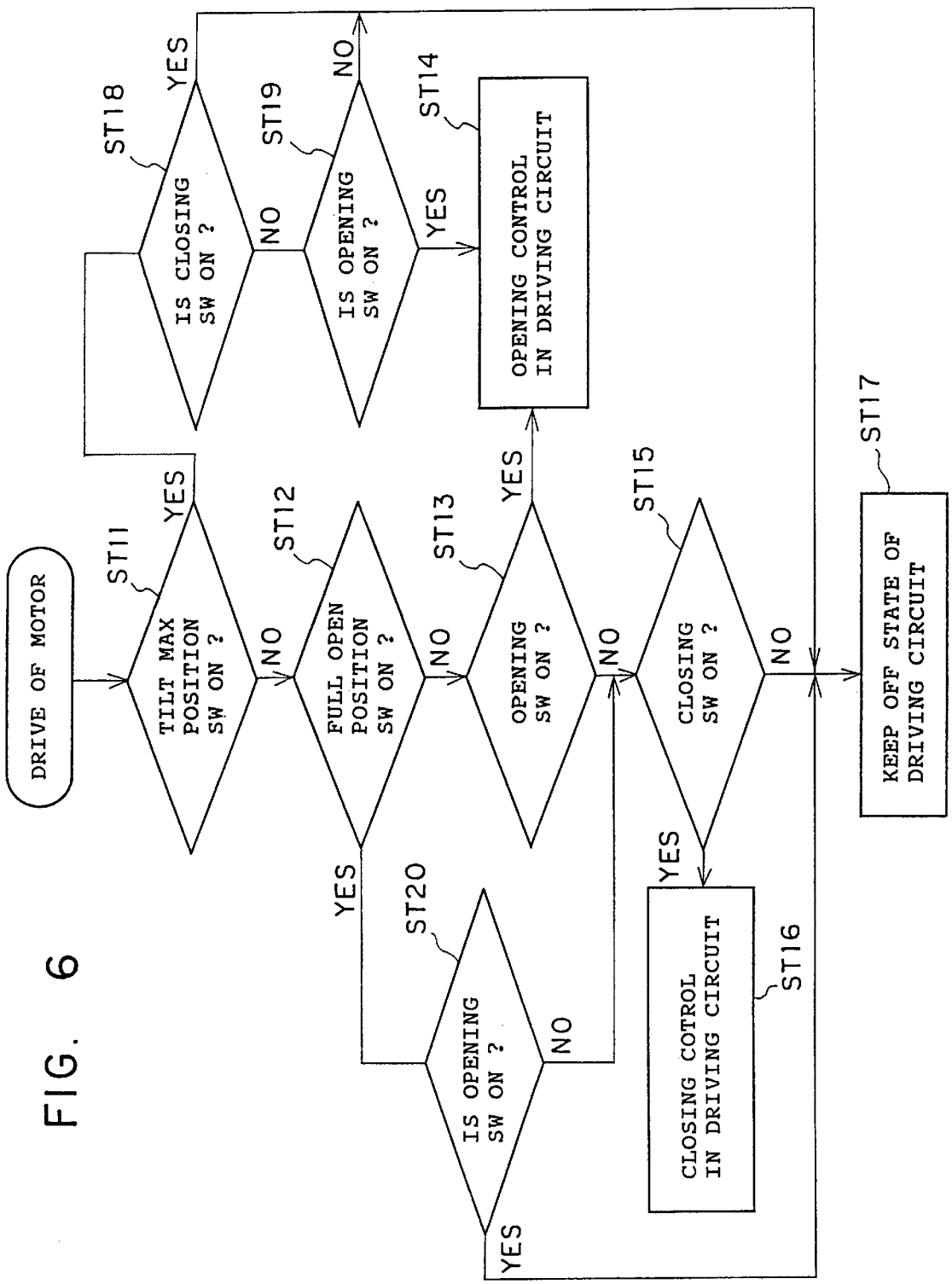
FIG. 6 is a flowchart showing a detailed operation of motor driving processing in the embodiment.

A description will now be given of processing in Step ST1, Step ST6, and Step ST3 in detail. Driving processing of the motor 11 in Step ST1 will be described with reference to a flowchart shown in FIG. 6. When the processing is started, it is decided in Step ST11 whether the tilt max position detecting switch 7 to detect a position of the sun-roof panel is ON or OFF, and it is decided in Step ST12 whether the full open position switch 6 is ON or OFF. When both of the tilt max position detecting switch 7 and the full open position switch 6 are OFF, the sun-roof panel is being stopped on the course of sliding. Thus, the operation proceeds to Step ST13. A state of the opening switch 3 is detected in Step ST13, and the operation proceeds to Step ST14 if the opening switch 3 is ON. In Step ST14, the driving transistor 35 in the driving circuit 30 is turned ON to regularly rotate the motor 11, and slide the sun-roof panel on the opening side.

Alternatively, when it is detected in Step ST13 that the opening switch 3 is OFF, the operation proceeds to Step ST15. In Step ST15, a state of the closing switch 4 is detected, and the operation proceeds to Step ST16 if the closing switch 4 is ON. In Step ST16, the driving transistor 36 in the driving circuit 30 is turned ON to reversely rotate the motor 11 so as to slide the sun-roof panel on the closing side. On the other hand, if the closing switch 4 is OFF, the operation proceeds to Step ST17 where the driving transistors 35 and 36 in the driving circuit 30 are kept in the OFF state.

If it is detected that the tilt max position switch 7 is ON in Step ST11, the sun-roof panel is in a tilt max position state and the operation proceeds to Step ST18. In Step ST18, the state of the closing switch 4 is detected, even if the closing switch 4 is ON, it is impossible to slide the sun-roof panel on the closing side. Therefore, the operation proceeds to Step ST17 where the driving transistors 35 and 36 in the driving circuit 30 are kept in the OFF state. Alternatively, if the closing switch 4 is OFF, the operation proceeds to Step ST19 where the state of the opening switch 3 is detected. If the opening switch 3 is ON, the operation proceeds to Step ST14 where the sun-roof panel is slid on the opening side. On the other hand, if the opening switch 3 is OFF, the operation proceeds to Step ST17 where the driving transistors 35 and 36 in the driving circuit 30 are kept in the OFF state.

If it is detected that the full open position switch 6 is ON in Step ST12, the sun-roof panel is being in the fully opened state, and the operation proceeds to Step ST20. In Step ST20, the state of the opening switch 3 is detected, even if the opening switch 3 is ON, it is impossible to further slide the sun-roof panel on the opening side. Consequently, the operation proceeds to Step ST17 where the driving transistors 35 and 36 in the driving circuit 30 are kept in the OFF state. Alternatively, if the opening switch 3 is OFF, the operation proceeds to Step ST15 where the state of the closing switch 4 is detected. According to the ON/OFF states of the closing switch 4, the operation proceeds to Step ST16 or Step ST17 where the above-mentioned processing is performed.

Figure 7:
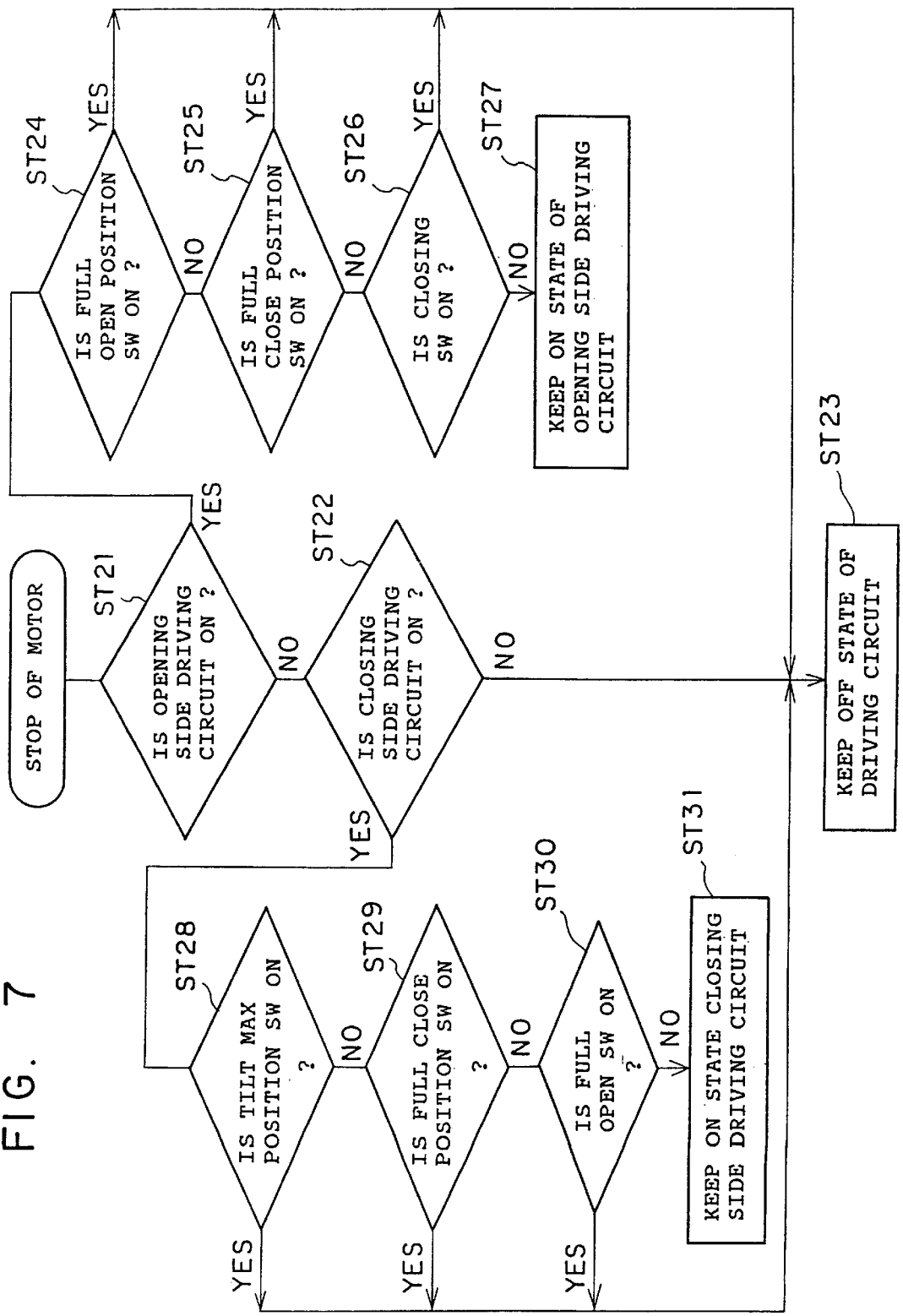
FIG. 7 is a flowchart showing a detailed operation of motor stopping processing in the embodiment.

Next, a description will now be given of stopping processing of the motor 11 in Step ST6 with reference to a flowchart shown in FIG. 7. When the stopping processing is started, in Step ST21, a state of an opening side driving circuit, that is, a state of the driving transistor 35 in the driving circuit 30 is detected. If the result of detection is OFF, the operation proceeds to Step ST22 to detect a state of a closing side driving circuit, that is, a state of the driving transistor 36 in the driving circuit 30. If the result of subsequent detection is also OFF, the operation proceeds to Step ST23 where the driving circuit 30 is set in the OFF state.

If it is detected that the opening side driving circuit is ON in Step ST21, that is, if the sun-roof panel is being slid on the opening side, the operation proceeds to Step ST24 to detect a state of the full open position switch 6. As a result, if the full open position switch 6 is ON, the sun-roof panel has reached the full open position. Thus, the operation proceeds to Step ST23 to set the driving circuit 30 in the OFF state. Alternatively, if the full open position switch 6 is OFF, the operation proceeds to Step ST25 to detect a state of the full close position switch 5. As a result, if the full close position switch 5 is ON, the sun-roof panel has reached the full close position from a tilt rising position. Thus, the operation proceeds to Step ST23 to set the driving circuit 30 in the OFF state.

On the other hand, if the full close position switch 5 is OFF, the operation proceeds to Step ST26. In Step ST26, the state of the closing switching 4 is detected. As a result of the detection, if the closing switch 4 is OFF, the operation proceeds to Step ST27 where the opening side driving circuit is kept in the ON state to keep sliding the sun-roof panel on the opening side. Alternatively, if the closing switch 4 is ON, the operation proceeds to Step ST23 where the driving circuit 30 is set in the OFF state to stop sliding of the sun-roof panel. That is, the motor 11 is stopped by operating a switch for a direction opposed to a rotation direction of the motor 11 to reversely rotate the motor 11 by a predetermined amount.

Alternatively, if it is detected that the closing side driving circuit is ON in Step ST22, that is, if the sun-roof panel is being slid on the closing side, the operation proceeds to Step ST28 to detect a state of the tilt max position switch 7. As a result, if the tilt max position switch 7 is ON, the sun-roof panel has reached the tile max position. Consequently, the operation proceeds to Step ST23 where the driving circuit 30 is set in the OFF state. Alternatively, if the tilt max position switch 7 is OFF, the operation proceeds to Step ST29 to detect the state of the full close position switch 5. As a result, if the full close position switch 5 is ON, the sun-roof panel has reached the full close position. Thus, the operation proceeds to Step ST23 to set the driving circuit 30 in the OFF state.

On the other hand, if the full close position switch 5 is OFF, the operation proceeds to Step ST30. In Step ST30, the state of the opening switch 3 is detected. As a result of the detection, if the opening switch 3 is OFF, the operation proceeds to Step ST31 to keep sliding the sun-roof panel on the closing side. Alternatively, if the opening switch 3 is ON, the operation proceeds to Step ST23 where the driving circuit 30 is set in the OFF state to stop sliding of the sun-roof panel.

A description will now be given of load detecting processing in Step ST3 shown in FIG. 5. The over load is detected by monitoring the driving current of the motor 11. That is, since the driving current of the motor 11 more increases as the load more increases, an increase in the driving current under a predetermined amount of over load is preset as a threshold, and the increase in the driving current is detected at predetermined time intervals. When the detected increase in the driving current exceeds the threshold, it is decided that there is the over load.

Figure 8A:
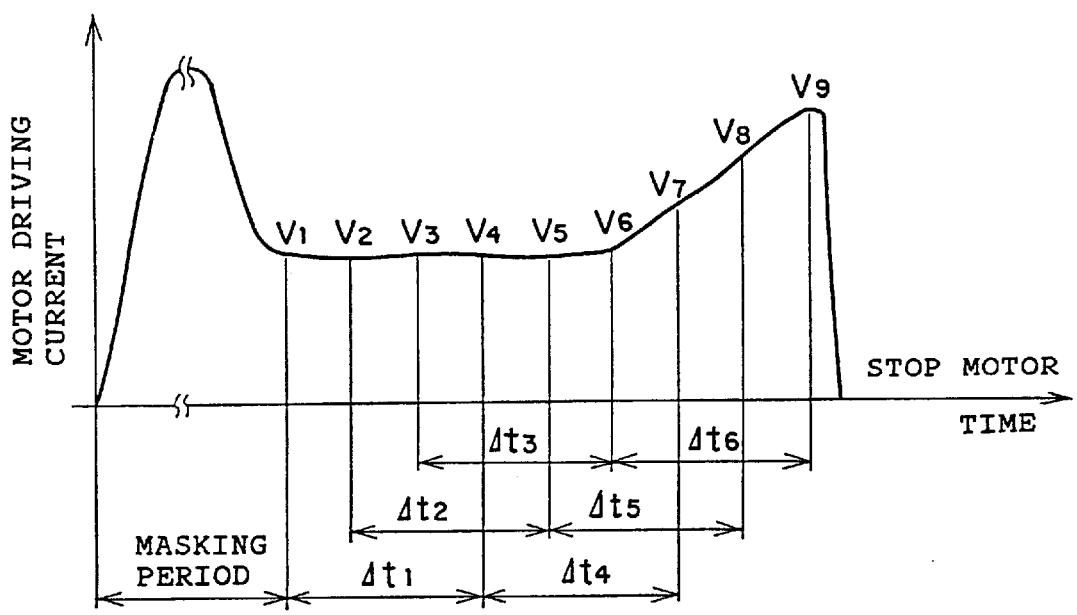
FIGS. 8A and 8B are graphs to illustrate load detecting processing in the embodiment.
Figure 8B:
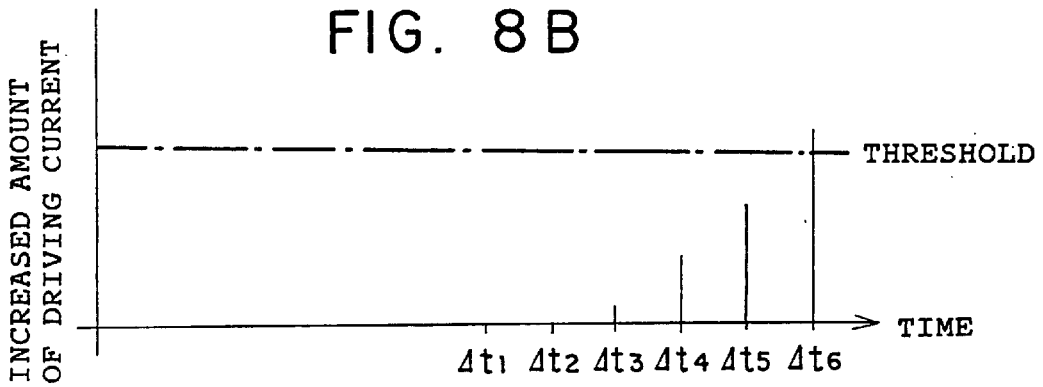

FIGS. 8A and 8B are graphs to illustrate the load detecting processing. FIG. 8A shows variation in the driving current for a period from a starting time to a stopping time of drive of the motor 11. FIG. 8B shows a relationship between the increased amount of the driving current and the threshold for each predetermined time interval. When an amount of the detected over load is constant, the increased amount of the driving current correlates to the voltage applied to the motor 11. Therefore, the applied voltage is divided at constant intervals, and the threshold for each interval is stored in a map such as a table diagram shown in FIG. 9.

Figure 10:
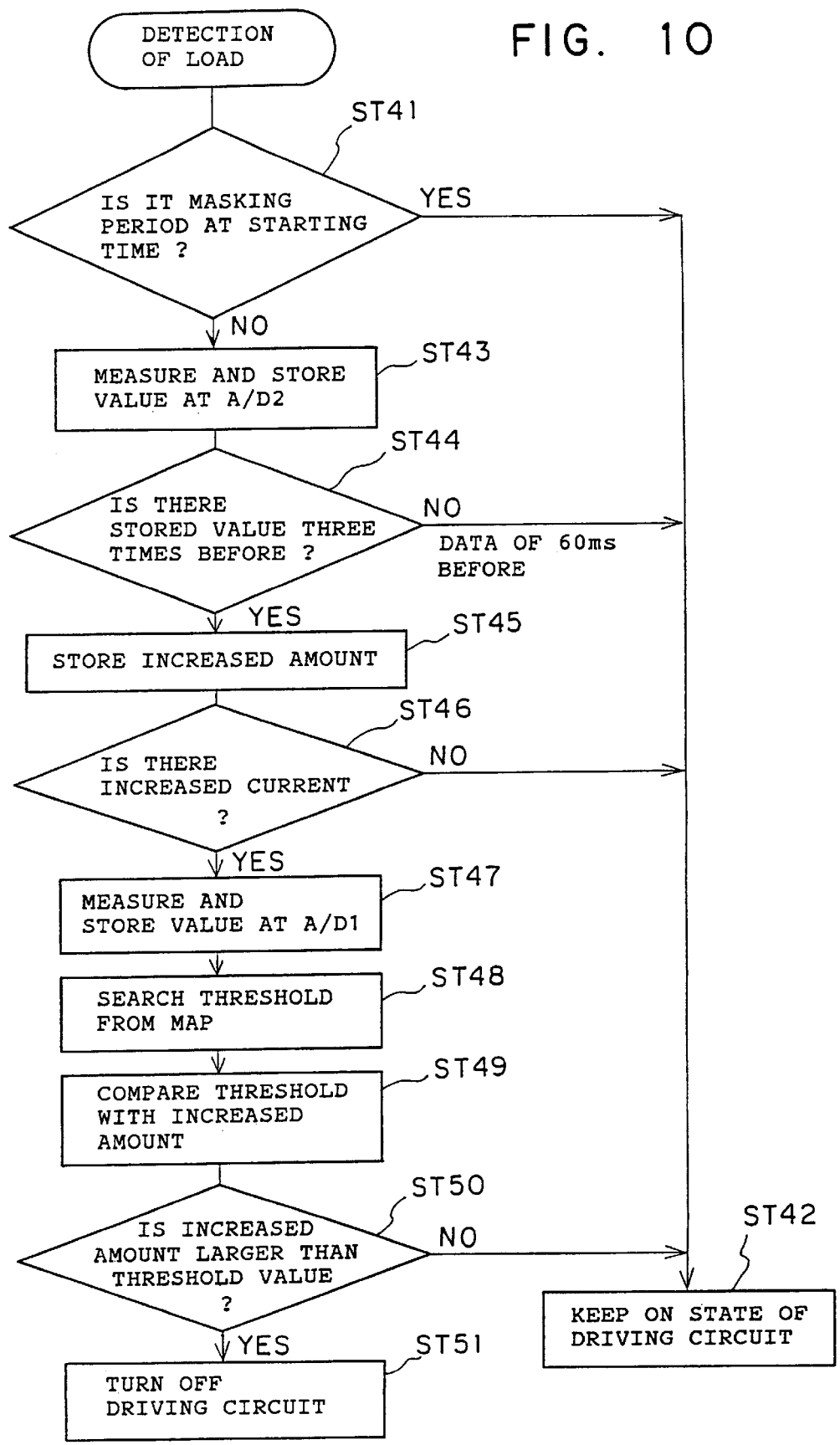
FIG. 10 is a flowchart showing a detailed operation of load detecting processing in the embodiment.

A description will now be given of the operation of the control processing circuit 8 performing the load detection shown in FIGS. 8A and 8B with reference to a flowchart shown in FIG. 10. The load detecting processing is performed for each 20 ms for a driving period of the motor 11. For the load detecting processing, in Step ST41, it is decided whether or not it is in a masking period at a starting time of the motor 11 shown in FIG. 8A. The decision is made by monitoring a timer to mask the signal input into the A/D2 port for only a period of about 200 ms for which transient current is generated at the starting time of the motor 11. The masking period is identical with a conventional masking period. As a result of the decision, if in the masking period, the operation proceeds to Step ST42 to keep driving the motor 11.

Alternatively, if out of the masking period, the operation proceeds to Step ST43 where a value of the signal input into the A/D2 port is measured and stored, and thereafter the operation proceeds to Step ST44. In Step ST44, it is detected whether or not there is a measured value of the input signal into the A/D2 port stored in processing three times before (i.e., 60 ms before) in Step ST43. Like V3 or earlier processing shown in FIG. 8A, if there is no stored value of the signal input into the A/D2 port three times before, the operation directly proceeds to Step ST42. On the other hand, like V4 or later processing shown in FIG. 8A, if there is the stored value of the signal input into the A/D2 portion three times before, the operation proceeds to Step ST45 to calculate a difference between a currently stored value and the stored value three times before so as to store the difference value.

Subsequently, the operation proceeds to Step ST46 to decide whether the value calculated in Step ST45 is positive or negative, that is, the driving current of the motor 11 is increased or decreased. As a result, like Δt1 and Δt2 shown in FIG. 8B, if the increased amount is zero or negative, the operation directly proceeds to Step ST42. Alternatively, like Δt3 to Δt6 shown in FIG. 8B, if the result of decision is positive, the operation proceeds to Step ST47 to measure and store a value of the signal input into the A/D1 port. Next, the operation proceeds to Step ST48 to search and extract a predetermined threshold from a map shown in FIG. 9 depending upon a value measured and stored in Step ST47, and thereafter proceeding to Step ST49.

In Step ST49, the increased amount of the driving current calculated and stored in Step ST45 is compared with the threshold extracted in Step ST48, and the result of comparison is decided in Step ST50. As a result of the decision, like Δt3 to Δt5 shown in FIG. 8B, if the increased amount is less than the threshold, the operation directly proceeds to Step ST42. On the other hand, like Δt6 shown in FIG. 8B, if the increased amount exceeds the threshold, the operation proceeds Step ST51 where the driving circuit 30 of the motor 11 is turned OFF to stop the motor 11.

In order to obtain the increased amount which is sufficient for sure decision in the control processing circuit 8, the increased amount of the driving current is calculated depending upon the comparison with the stored value three times before (60 ms before). However, it is to be noted that the stored value used for comparison may be a stored value four times before (i.e., 80 ms before), a stored value two times before (i.e., 40 ms before), or the like.

According to the embodiment 1 of the present invention, instead of using a conventional threshold VMC of the driving current itself, the predetermined increased amount of the driving current is preset as the threshold. Therefore, the threshold is hardly varied even immediately after the masking period. Further, if a predetermined threshold or a time interval to detect the driving current is set appropriately, it is possible to surely detect the over load even in case of slower variation in the driving current.

Embodiment 2

Figure 11:
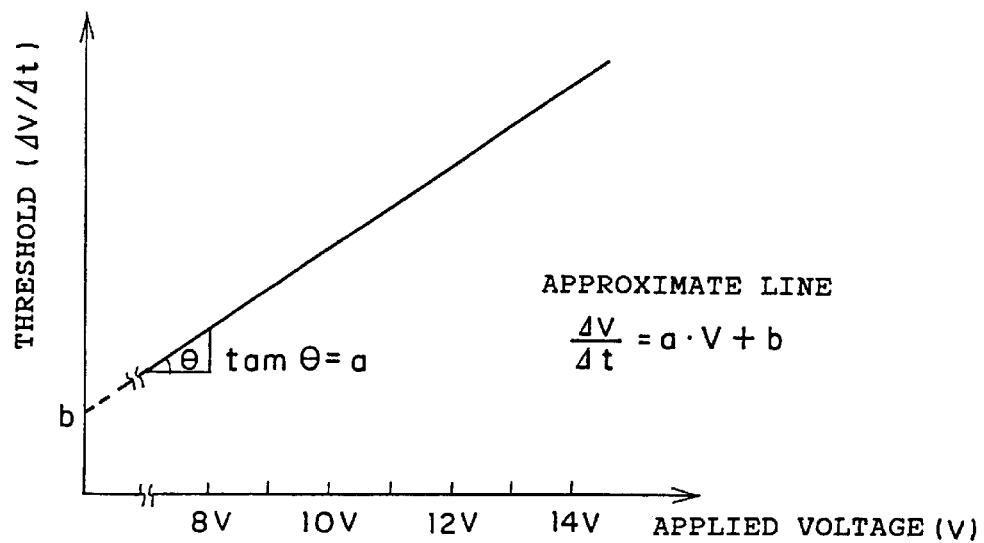
FIG. 11 is a graph showing a correlation between voltage applied to a motor and a threshold in a method of controlling an on-vehicle electric opening/closing body according to the embodiment 2 of the present invention.

A description will now be given of the embodiment 2 of the present invention with reference to the drawings. FIG. 11 is a graph showing a correlation between voltage applied to a motor 11 and a threshold to illustrate the second embodiment 2 of the present invention. When an amount of detected over load is constant, there is the correlation serving as a linear function as shown in the drawing between the threshold in an amount of variation in driving current and the voltage applied to the motor 11. Consequently, the threshold can be expressed as the following expression by obtaining a slope a and an intercept b of the function from experimental data:

Threshold of Over Load=$a$×(Voltage applied to Motor 11)+$b$

Therefore, it is possible to store the slope a and the intercept b, instead of a map shown in FIG. 9, in a control processing circuit 8 so as to calculate the threshold of the over load depending upon the voltage applied to the motor 11 by using the above expression, thereby performing decision of the over load.

Embodiment 3

Figure 12A:
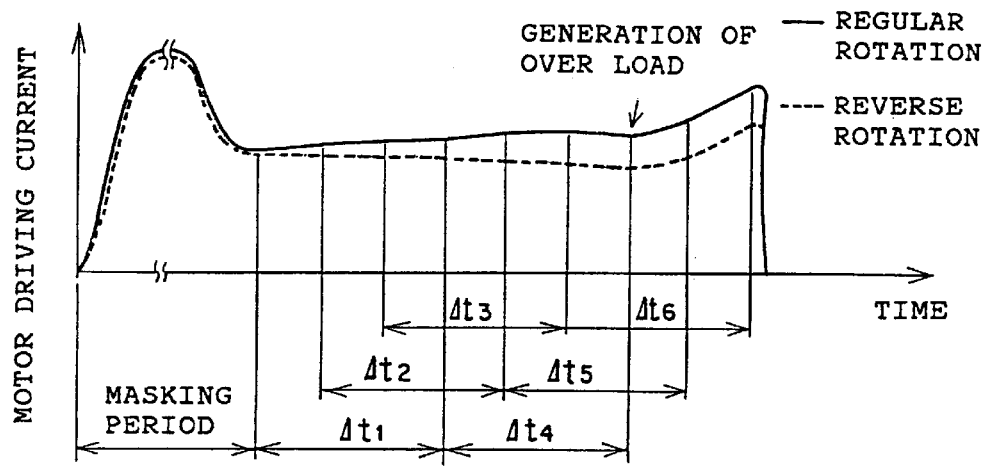
FIGS. 12A and 12B are graphs to illustrate load detecting processing in a method of controlling an on-vehicle electric opening/closing body according to the embodiment 3 of the present invention.
Figure 12B:
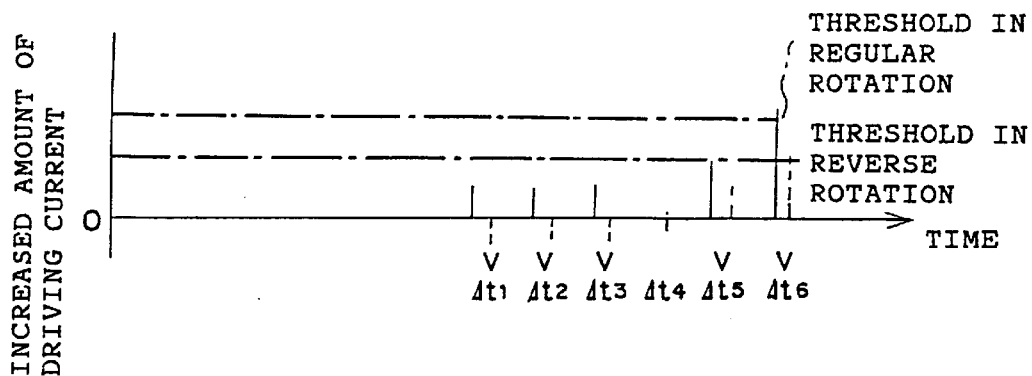

A description will now be given of the third embodiment 3 of the present invention with reference to the drawings. FIGS. 12A and 12B are graphs to illustrate load detecting processing in the third embodiment 3 of the present invention. When different loads are used depending upon whether a motor 11 is regularly or reversely rotated by effect of gravitational acceleration like at tilt rising/falling times, it is effective to perform load detecting control using different thresholds according to regular rotation or reverse rotation of the motor 11. FIG. 12A shows variation in driving current at times of the regular rotation and the reverse rotation for a period from a starting time to a stopping time of drive of the motor 11. FIG. 12B shows a relationship between an increased amount of each driving current for each predetermined time interval and thresholds of amounts of variation in the driving current set corresponding to the regular rotation and the reverse rotation. In this case, applied voltage is divided at constant intervals, and the thresholds at the times of regular rotation and reverse rotation for each interval are stored in a map shown in FIG. 13.

Figure 14:
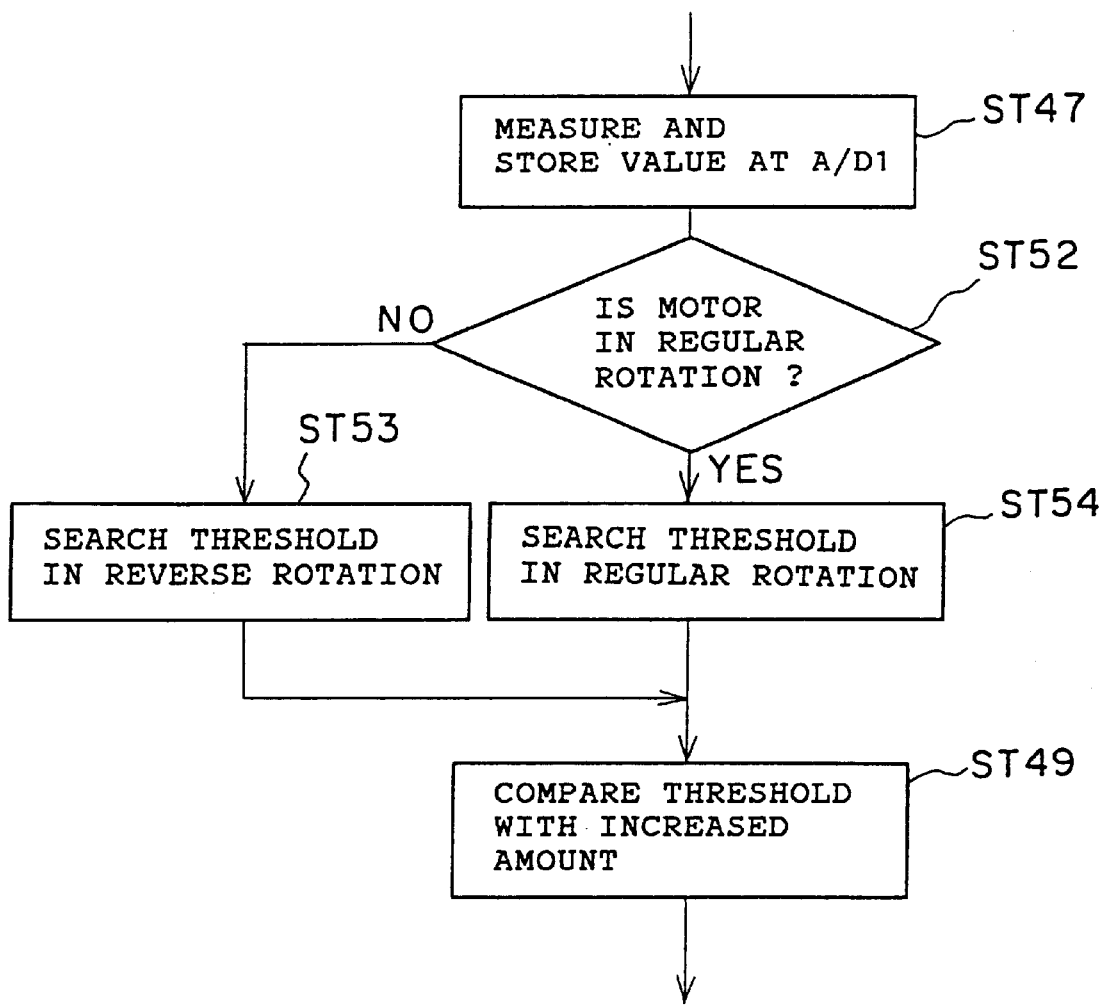
FIG. 14 is a flowchart showing an essential part in a detailed operation of load detecting processing in the embodiment.

Next, a description will now be given of the operation of a control processing circuit 8 for the load detecting processing shown in FIGS. 12A and 12B. FIG. 14 is a flowchart selectively showing an essential part of the load detecting processing, in which Steps ST52 to ST54 shown in FIG. 14 substitute for Step ST48 in the load detecting processing in the embodiment 1 illustrated in FIG. 10. Consequently, since other processing are identical with those in the embodiment 1, descriptions thereof are omitted. The following description concerns to only processing from Step ST47 to Step ST49.

After Step ST47 where a value of a signal input into an A/D1 port is measured and the measured value stored, the operation proceeds to Step ST52. In Step ST52, it is decided whether the motor 11 is rotated regularly or reversely. If the motor 11 is reversely rotated, the operation proceeds to Step ST53. Alternatively, if regularly rotated, the operation proceeds to Step ST54. In Step ST53, a predetermined threshold at the time of reverse rotation is searched and extracted from the map shown in FIG. 13 depending upon the value stored in Step ST47, thereafter proceeding to Step ST49. In Step ST54, a predetermined threshold at the time of regular rotation is searched and extracted from the map shown in FIG. 13 depending upon the value stored in Step ST47, thereafter proceeding to Step ST49. In Step ST49, the extracted threshold is compared with the increased amount of the driving current, and control to stop or keep driving the motor 11 is made depending upon the result of comparison.

In Step ST52, it is decided whether the motor 11 is regularly or reversely rotated by detecting levels of an O1 port and an O2 port of the control processing circuit 8.

Embodiment 4

Figure 15A:
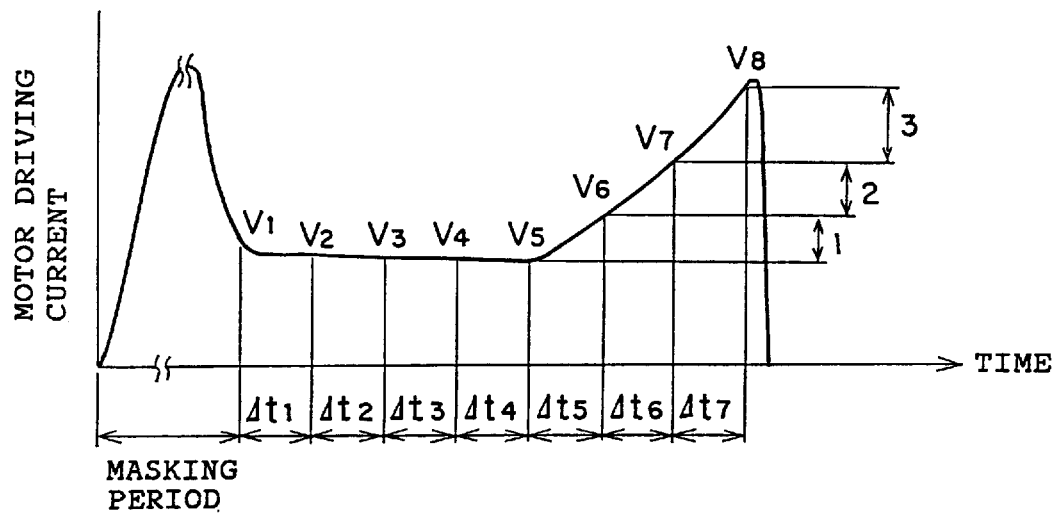
FIGS. 15A and 15B are graphs to illustrate load detecting processing in a method of controlling an on-vehicle electric opening/closing body according to the embodiment 4 of the present invention.
Figure 15B:
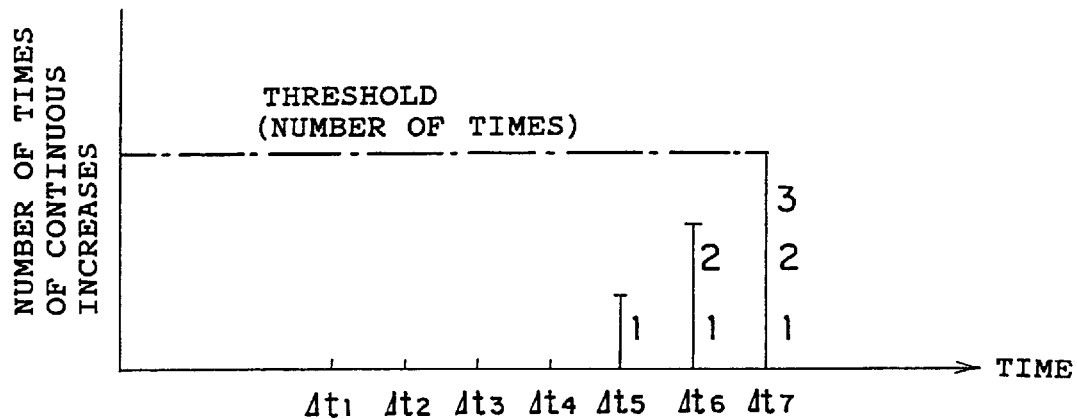

A description will now be given of the fourth embodiment 4 of the present invention with reference to the drawings. FIGS. 15A and 15B are graphs to illustrate load detecting processing in the fourth embodiment 4 of the present invention. FIG. 15A shows variation in driving current for a period from a starting time to a stopping time of drive of a motor 11. FIG. 15B shows a relationship between the number of times of continuous increases in the driving current for each predetermined time interval and a threshold. Since variation in voltage applied to the motor 11 changes a speed of the motor 11, the applied voltage is divided at constant intervals, and the threshold at each interval is stored in a map shown in FIG. 16.

Figure 17:
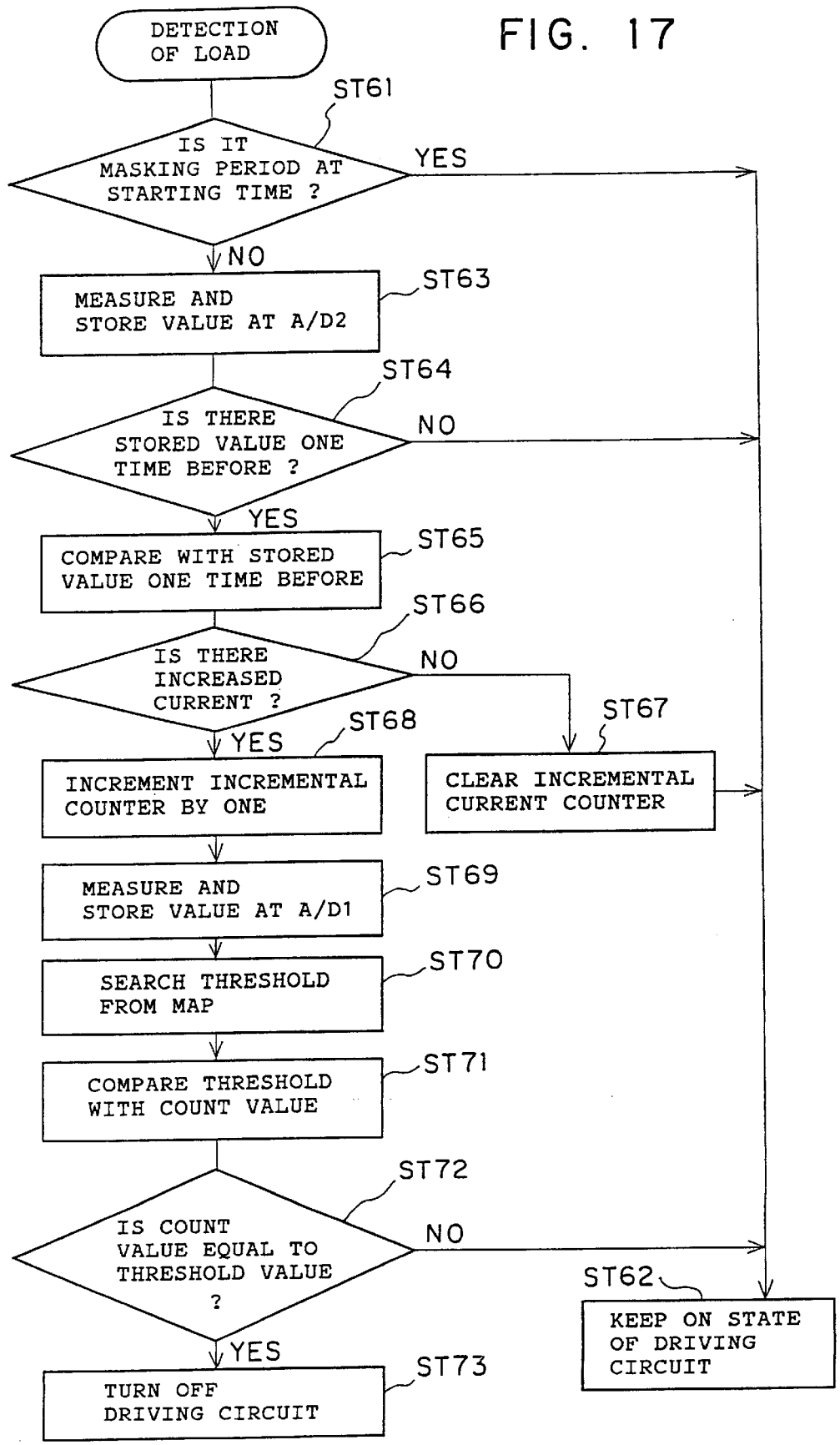
FIG. 17 is a flowchart showing a detailed operation of load detecting processing in the embodiment.

Next, a description will now be given of the operation of a control processing circuit 8 for the load detecting processing shown in FIGS. 15A and 15B with reference to a flowchart shown in FIG. 17. The load detecting processing is executed for each 20 ms for a driving period of the motor 11. For the load detecting processing, in Step ST61, it is decided whether or not it is in a masking period at the starting time of the motor 11. The decision is made by monitoring a timer to mask a signal inputted into an A/D2 port by a time of about 200 ms for which transient current is generated at the starting time of the motor 11. As a result of decision, if in the masking period, the operation proceeds to Step ST62 to keep driving the motor 11

Alternatively, if out of the masking period, the operation proceeds to Step ST63 where a value of a signal input into the A/D2 port is measured and stored, thereafter proceeding the Step ST64. In Step ST64, it is detected whether or not there is the measured value of the input signal into the A/D2 port stored in processing one time before in Step ST63. Like V1 processing shown in FIG. 15A, if the value of the input signal into the A/D2 port is not stored in the processing one time before, the operation directly proceeds to Step ST62. On the other hand, like V2 or later processing shown in FIG. 15B, if the value of the input signal into the A/D2 port is stored in the processing one time before, the operation proceeds to Step ST65 to compare a current stored value with the stored value one time before.

Subsequently, the operation proceeds to Step ST66 to decide the result of comparison in Step ST65, that is, decide whether the driving current of the motor 11 is increased or decreased. As a result, if the driving current is not increased or is decreased like Δt1 to Δt4 shown in FIG. 15B, the operation proceeds to Step ST67 to clear an incremental current counter for counting the number of times of continuous increases in the driving current, thereafter proceeding to Step ST62. Alternatively, if the driving current is increased like Δt5 to Δt7 shown in FIG. 15B, the operation proceeds to Step ST68 to increment the incremental current counter by one, thereafter proceeding to Step ST69.

In Step ST69, a value of a signal input into an A/D1 port is measured and stored, thereafter proceeding Step ST70. In Step ST70, a predetermined threshold is searched and extracted from the map shown in FIG. 16 depending upon the value measured and stored in Step ST69, thereafter proceeding to Step ST71. In Step ST71, a count value of the incremental current counter incremented in Step ST68 is compared with the threshold extracted in Step ST70. In Step ST72, the result of comparison is decided. As a result of comparison, like Δt5 and Δt6 shown in FIG. 15B, if the count value is less than the threshold, the operation directly proceeds to Step ST62. On the other hand, like Δt7 shown in FIG. 15B, if the count value is equal to the threshold, the operation proceeds to Step ST73 to turn OFF a driving circuit 30 so as to stop the motor 11.

Embodiment 5

Figure 18A:
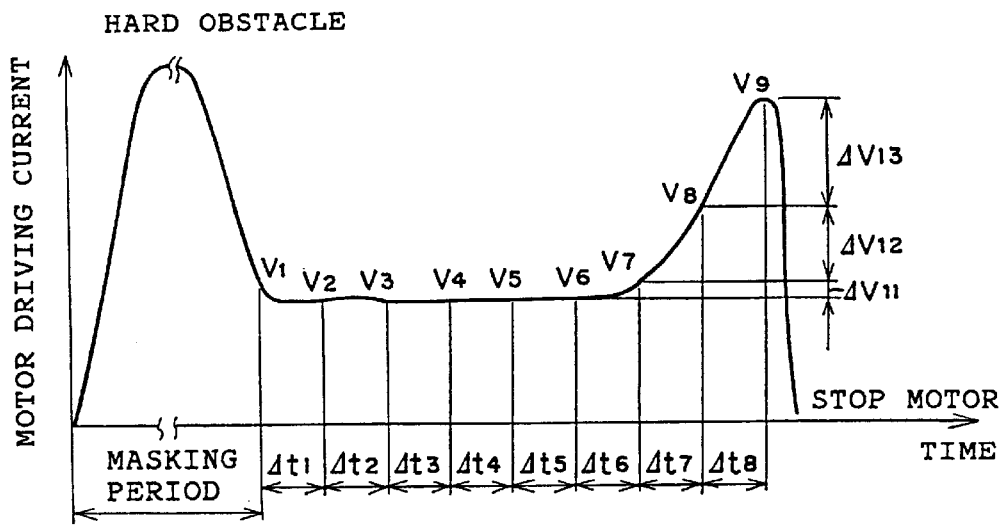
FIGS. 18A to 18C are graphs to illustrate load detecting processing in a method of controlling an on-vehicle electric opening/closing body according to the embodiment 5 of the present invention.
Figure 18B:
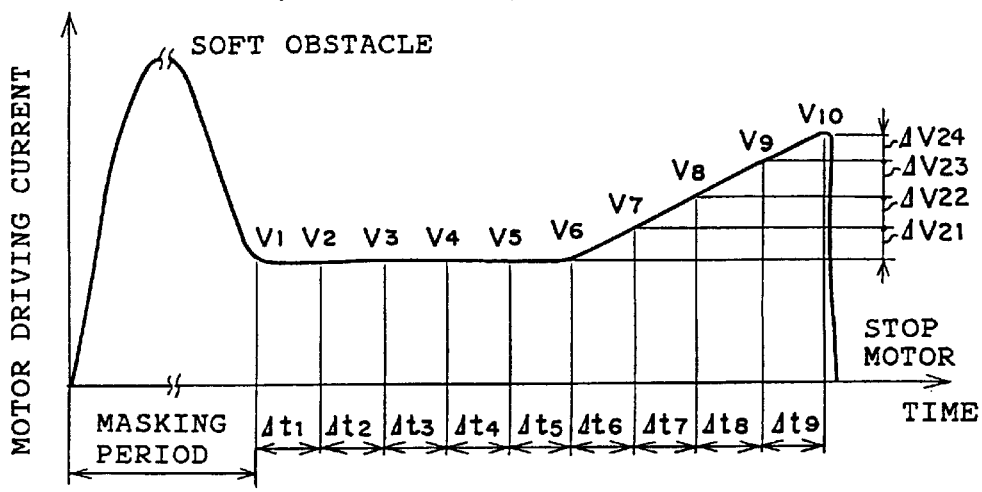
Figure 18C:
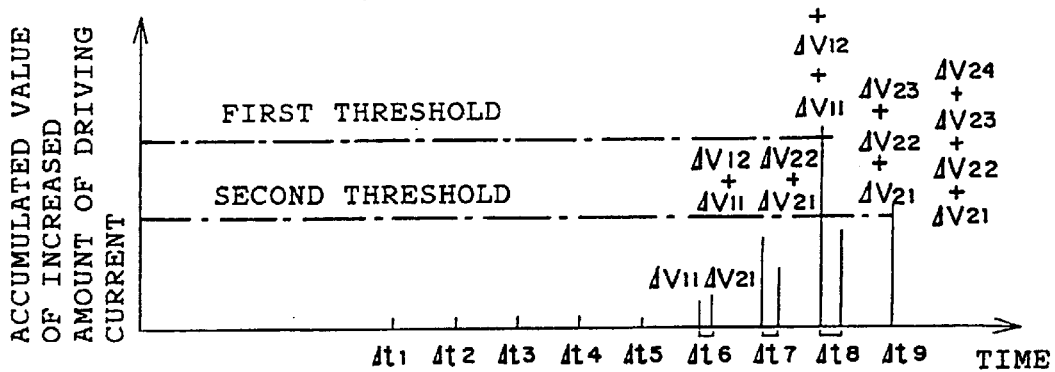

A description will now be given of the fifth embodiment 5 of the present invention with reference to the drawing. FIGS. 18A to 18C are graphs to illustrate load detecting processing in the fifth embodiment 5 of the present invention. FIG. 18A shows variation in driving current in case of a hard object for a period from a starting time to a stopping time of drive of a motor 11, and FIG. 18B shows variation in the driving current in case of a soft object for the same period. FIG. 18C shows a relationship between an accumulated value of an increased amount of the driving current and a threshold corresponding to hardness of objects.

If a sun-roof panel pinches an over load object, that is, a hard obstacle (having heavy-load), the driving current of the motor 11 is rapidly increased as shown in FIG. 18A. On the other hand, in case of a soft obstacle (having light-load), the driving current of the motor 11 is slowly increased as shown in FIG. 18B. Hence, if only one threshold corresponding to the hard obstacle having the heavy-load is set for load detection, an extremely long time is required to perform over load decision of the soft obstacle having the light-load. For purpose of reduction of the time, as shown in FIG. 19, voltage applied to the motor 11. is divided at constant intervals, and a first threshold and a second threshold less than the first threshold by a predetermined amount are set and stored in a map as the threshold for each interval. The first threshold is switched over to the second threshold depending upon predetermined timing so as to perform the over load decision.

Figure 20:
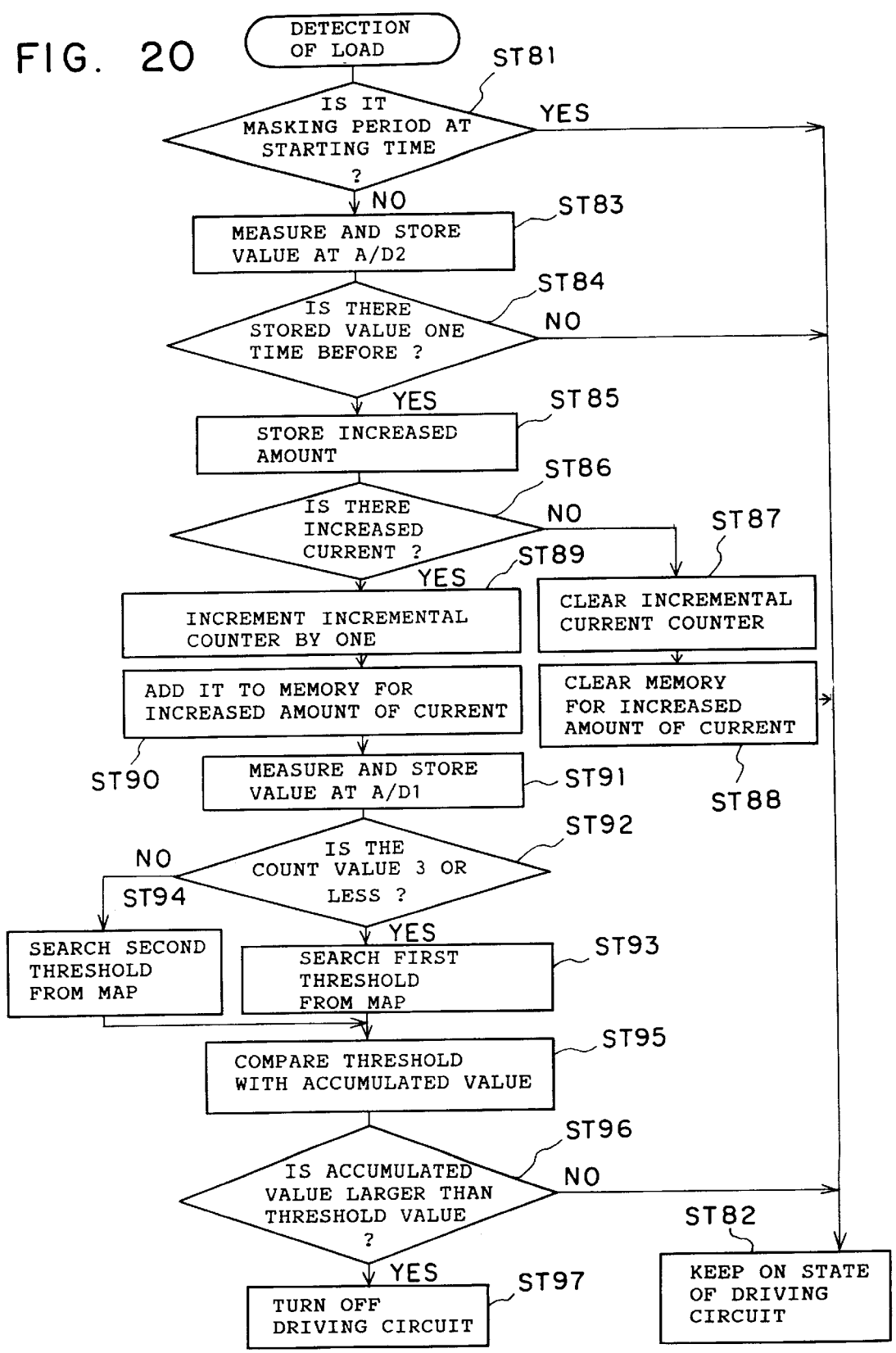
FIG. 20 is a flowchart showing a detailed operation of load detecting processing in the embodiment.

Next, a description will now be given of the operation of a control processing circuit 8 for performing the load detecting processing shown in FIGS. 18A to 18C with reference to FIG. 20. The load detecting processing is executed for each 20 ms for a driving period of the motor 11. For the load detecting processing, in Step ST81, it is decided whether or not it is in a masking period at a starting time of the motor 11 shown in FIGS. 18A and 18B. The decision is made by monitoring a timer to mask a signal input into an A/D2port by a time of about 200 ms for which transient current is generated at the starting time of the motor 11. As a result of the decision, if in the masking period, the operation proceeds to Step ST82 to keep driving the motor 11.

Alternatively, if out of the masking period, the operation proceeds to Step ST83 to measure and store a value of the signal input into the A/D2 port, thereafter proceeding to Step ST84. In Step ST84, it is detected whether or not there is the measured value of the input signal into the A/D2 port stored in processing one time before in Step ST83. If the value of the input signal into the A/D2 port is not stored in the processing one time before, the operation directly proceeds to Step ST82 to keep driving the motor 11. On the other hand, if the value of the input signal into the A/D2 port is stored in the processing one time before, the operation proceeds to Step ST85 to calculate and store a difference between a current stored value and the stored value one time before, thereafter proceeding to Step ST86.

In Step ST86, it is decided whether the driving current of the motor 11 is increased or decreased depending upon the result of calculation in Step ST85. As a result, like Δt1 to Δt5 shown in FIG. 18C, if the driving current is not increased or is decreased, the operation proceeds to Step ST87 to clear an incremental current counter for counting the number of times of continuous increases in the driving current. Further, the operation proceeds to Step ST88 to clear a memory for increased amount of current to accumulate and store the increased amount of the driving current continuously increasing, thereafter proceeding the Step ST82 to keep driving the motor 11.

Alternatively, like Δt6 to Δt9 (Δt9 used only in case of the soft obstacle) shown in FIG. 18B, if the driving current is increased, the operation proceeds to Step ST89 to increment the incremental current counter by one, and proceeds to Step ST90. In Step ST90, an increased amount of the driving current stored in Step ST85 is accumulated into the memory for increased amount of current, and the operation proceeds to Step ST91. That is, ΔV11 to ΔV13 are sequentially accumulated in case of the hard object shown in FIG. 18A, and ΔV21 to ΔV24 are sequentially accumulated in case of the soft object shown in FIG. 18B.

In Step ST91, a value of a signal input into an A/D1 port is measured and stored, and the operation proceeds to Step ST92. In Step ST92, a count value of the incremental current counter is decided, and if the count value is a predetermined value, for example, three or less, the operation proceeds to Step ST93. If the count value is four or less, the operation proceeds to Step ST94. In Step ST93, a predetermined first threshold is searched and extracted from a map shown in FIG. 19 depending upon the value measured and stored in Step ST91, thereafter proceeding Step ST95. In Step ST94, a predetermined second threshold is searched and extracted from a map shown in FIG. 19 depending upon the value measured and stored in Step ST91, thereafter proceeding to Step ST95.

In Step ST95, the stored value in the memory for increased amount of current accumulated in Step ST90 is compared with the first threshold or the second threshold extracted in Step ST93 or Step ST94. Then, the operation proceeds to Step ST96 to decide the result of comparison. As a result of the decision, if the accumulated value of the increased amount of current is less than the first threshold like Δt6 and Δt7 in case of the hard object shown in FIG. 18C, or if the accumulated value of the increased amount of current is less than the second threshold like Δt6 to Δt8 in case of the soft object, the operation directly proceeds to Step ST82.

On the other hand, if the accumulated value of the increased amount of current is larger than or equal to the first threshold like Δt8 in case of the hard object shown in FIG. 18C, or if the accumulate value of the increased amount of current is larger than or equal to the second threshold like Δt9 in case of the soft object, the operation proceeds to Step ST97. In Step ST97, a driving circuit 30 of the motor 11 is turned OFF to stop the motor 11.

The two types of thresholds are used for processing as set forth above, to enable decision of over load due to the soft object in a shorter time. That is, the increased amount of the driving current accumulated for a period of 60 ms after generation of the over load is compared with the first threshold. If the increased amount exceeds the first threshold, it is decided that the over load occurs to stop the motor 11. If the increased amount does not exceed the first threshold, it is decided that the object is soft to compare the increased amount of the driving current accumulated for a period of 80 ms after generation of the over load with the second threshold less than the first threshold so as to perform the decision of over load.

As set forth above, according to the first aspect of the present invention, the amount of variation in the driving current of the motor is detected at predetermined time intervals, and is compared with the predetermined threshold concerned with the amount of variation in the driving current so as to perform the decision of over load, thereby eliminating the need for the threshold of the driving current itself. As a result, there is an effect in that it is possible to provide a method of controlling an on-vehicle electric opening/closing body to surely detect the over load generated during sliding of the on-vehicle electric opening/closing body such as sun-roof even if any obstacle exists immediately after the masking period. Further, there is another effect in that it is possible to surely detect the over load even in case of lower variation in the driving current by appropriately setting the predetermined threshold or the predetermined time interval.

According to the second aspect of the present invention, the increase in the driving current of the motor is detected at the predetermined time interval to compare the number of times of continuous increases in the driving current with the predetermined threshold so as to perform the decision of over load. As a result, there is an effect in that the amount of the program memory can be saved.

According to the third aspect of the present invention, the amount of variation in the driving current of the motor is detected at the predetermined time interval, and the amount of variation is accumulated when the driving current is continuously increased. Further, the accumulated value is compared with the predetermined threshold to perform the decision of over load. It is thereby possible to perform the decision of over load from the time of generation of the over load, resulting in an effect of reduction of a time required for processing.

According to the fourth aspect of the present invention, the threshold for the over load decision is determined depending upon the voltage applied to the motor. As a result, there is an effect in that the over load decision can be surely performed even if the battery voltage is varied.

According to the fifth aspect of the present invention, the different thresholds are set corresponding to regular rotation/reverse rotation of the motor. As a result, there is an effect in that the decision of over load can be surely performed even if an amount of sliding load may be varied depending upon the rotation directions of the motor.

According to the sixth aspect of the present invention, the plurality of thresholds are prepared to be switched over according to the objects generating the over load. As a result, there is an effect in that sure and rapid decision of over load can be performed with respect to different types of objects generating the over load.

While preferred embodiments of the invention have been described using specific terms, such description is for illustrative purposes only, and it is to be understood that changes and variations may be made without departing from the spirit or scope of the following claims.

What is claimed is:

1. A method of controlling an on-vehicle electric opening/closing body driven by a motor comprising the steps of:
   detecting a variation in a load current of said motor over a predetermined period of time;
   establishing at least one threshold value based on an actual voltage being applied to said motor; and
   determining an overload state of said motor based on a comparison of said variation in said load current and said threshold value.

2. The method of claim 1, further comprising the step of:
   stopping said motor when it is determined that said motor is in said overload state.

3. The method of claim 1, wherein said determining step comprises the substep of determining occurrence of said overload state when said variation in load current increases above said threshold value.

4. The method of controlling an on-vehicle electric opening/closing body according to claim 2, wherein said stopping step comprises the substep of reversely rotating said motor by a predetermined amount prior to the stopping of said motor.

5. The method of controlling an on-vehicle electric opening/closing body according to claim 1, wherein said establishing step comprises the substep of, increasing said threshold value as said actual voltage being applied to said motor increases.

6. The method of controlling an on-vehicle electric opening/closing body according to claim 1, wherein said establishing step comprises the substep of establishing said threshold value as a linear function of said voltage being applied to said motor.

7. The method of controlling an on-vehicle electric opening/closing body according to claim 1, wherein said detecting step comprises the substep of detecting said load current at least three times, separated by said predetermined period of time, and said variation in load current is obtained by using at least two detected load currents separated at least by two predetermined periods of time.

8. The method of controlling an on-vehicle electric opening/closing body according to claim 1, wherein said establishing step comprises the substep of setting said threshold value to different values depending upon whether said motor is rotated in a regular direction or in a reverse direction.

9. The method of controlling an on-vehicle electric opening/closing body according to claim 1, wherein
   said detecting step comprises the substep of counting an actual number of consecutive predetermined periods of time where said load current has increased from a previously detected load current; and
   said determining step includes the substep of determining that said motor is in said overload state when said actual number exceeds said threshold value.

10. The method of controlling an on-vehicle electric opening/closing body according to claim 9, wherein said threshold value decreases as said voltage being applied to said motor increases.

11. The method of controlling an on-vehicle electric opening/closing body according to claim 1, wherein
said detecting step comprises the substep of accumulating each said variation in load current over a predetermined number of consecutive predetermined periods of time, and
said determining step comprises the substep of determining that said motor is in said overload state when an amount accumulated in said accumulating step exceeds said threshold value.

12. The method of controlling an on-vehicle electric opening/closing body according to claim 1, wherein said establishing step comprises the substeps of
establishing a plurality of second threshold values based on said voltage being applied to said motor and on hardness of objects generating said overload, and
selecting one of the plurality of said second threshold values as said threshold value based on said variation in load current within a predetermined period of time.

13. The method of controlling an on-vehicle electric opening/closing body according to claim 9, wherein said establishing step comprises the substeps of
establishing a plurality of second threshold values based on said voltage being applied to said motor and on hardness of objects generating said overload, and
selecting one of the plurality of said second threshold values as said threshold value based on said variation in load current within a predetermined period of time.

14. The method of controlling an on-vehicle electric opening/closing body according to claim 11, wherein said establishing step comprises the substeps of
establishing a plurality of second threshold values based on said voltage being applied to said motor and on hardness of objects generating said overload, and
selecting one of the plurality of said second threshold values as said threshold value based on said variation in load current within a predetermined period of time.

15. An apparatus for controlling an on-vehicle opening/closing body, comprising:
a motor for driving said opening/closing body;
current detecting means for detecting a variation in a load current of said motor over a predetermined period of time;
voltage detecting means for detecting an actual voltage being applied to said motor;
establishing means for establishing at least one threshold value based on said actual voltage being applied to said motor; and
overload determining means for determining an overload state of said motor based on a comparison of said variation in said load current and said threshold value.

16. An apparatus for controlling an on-vehicle opening/closing body of claim 15, further comprising:
stopping means for stopping said motor when said overload state is determined.

17. An apparatus for controlling an on-vehicle opening/closing body of claim 15, wherein,
said establishing means increases the threshold value as the voltage being applied to said motor increases.

18. An apparatus for controlling an on-vehicle opening/closing body of claim 15, wherein
said overload determining means determines occurrence of said overload state when said variation in said load current increases above said threshold value.

19. An apparatus for controlling an on-vehicle opening/closing body of claim 16, wherein said stopping means comprises,
reversing means for reversely rotating said motor by a predetermined amount prior to stopping said motor.

20. An apparatus for controlling an on-vehicle opening/closing body of claim 15, wherein said establishing means comprises,
means for establishing said threshold value as a linear function of said voltage being applied to said motor.

21. An apparatus for controlling an on-vehicle opening/closing body of claim 17, wherein said current detecting means comprises,
means for detecting said load current at least three times separated by said predetermined period of time, and said variation in load current is obtained by using at least two detected load currents separated at least by two predetermined periods of time.

22. An apparatus for controlling an on-vehicle opening/closing body of claim 15, wherein said establishing means comprises,
means for setting said threshold value to different values depending upon whether said motor is rotated in a regular direction or in a reverse direction.

23. An apparatus for controlling an on-vehicle opening/closing body of claim 19, wherein
said current detecting means comprises,
a counter counting an actual number of consecutive predetermined periods of time where said load current has increased from a previously detected load current; and
said overload determining means comprises,
means for determining that said motor is in said overload state when said actual number is equal to said threshold value.

24. An apparatus for controlling an on-vehicle opening/closing body of claim 23, wherein said establishing means decreases said threshold value as said voltage being applied to said motor increases.

25. An apparatus for controlling an on-vehicle opening/closing body of claim 15, wherein said current detecting means comprises,
means for accumulating each said variation in load current over a predetermined number of consecutive predetermined periods of time; and wherein
said overload determining means determines said overload state of said motor when an accumulated amount exceeds said threshold value.

26. An apparatus for controlling an on-vehicle opening/closing body of claim 15, wherein said establishing means comprises,
means for establishing a plurality of second threshold values based on said voltage being applied to said motor and on hardness of objects generating said overload, and
means for selecting one of the plurality of said second threshold values as said threshold value based on said variation in load current within a predetermined period of time.

27. An apparatus for controlling an on-vehicle opening/closing body of claim 23, wherein said establishing means comprises,
means for establishing a plurality of second threshold values based on said voltage being applied to said motor and on hardness of objects generating said overload, and means for selecting one of the plurality of said second threshold values as said threshold value based on said variation in load current within a predetermined period of time.

28. An apparatus for controlling an on-vehicle opening/closing body of claim 29, wherein said establishing means comprises, means for establishing a plurality of second threshold values based on said voltage being applied to said motor and on hardness of objects generating said overload, and means for selecting one of said plurality of said second threshold values as said threshold value based on said variation in load current within a predetermined period of time.

* * * * *